(12) United States Patent
Vander Mey et al.

(10) Patent No.: US 11,977,394 B2
(45) Date of Patent: May 7, 2024

(54) HYBRID GYRODYNE AIRCRAFT

(71) Applicant: Aergility Corporation, Dunnellon, FL (US)

(72) Inventors: James E. Vander Mey, Dunnellon, FL (US); Lawrence Winston Yonge, III, Dunnellon, FL (US)

(73) Assignee: Aergility Corporation, Dunnellon, FL (US)

( * ) Notice: Subject to any disclaimer, the term of this patent is extended or adjusted under 35 U.S.C. 154(b) by 120 days.

(21) Appl. No.: 17/603,190

(22) Filed: Oct. 12, 2021

(65) Prior Publication Data

US 2022/0055742 A1 Feb. 24, 2022

Related U.S. Application Data

(63) Continuation of application No. PCT/US2020/027590, filed on Apr. 10, 2020.
(Continued)

(51) Int. Cl.
*B64C 27/10* (2023.01)
*B64C 11/50* (2006.01)
(Continued)

(52) U.S. Cl.
CPC ............ *G05D 1/0858* (2013.01); *B64C 11/50* (2013.01); *B64C 27/006* (2013.01); *B64C 27/02* (2013.01);
(Continued)

(58) Field of Classification Search
CPC ...... G05D 1/0858; B64C 27/10; B64C 27/22; B64C 2027/8236; B64C 11/48;
(Continued)

(56) References Cited

U.S. PATENT DOCUMENTS 3,618,875 A 11/1971 Kappus
5,727,754 A 3/1998 Carter, Jr.
(Continued)

FOREIGN PATENT DOCUMENTS

CN 102360218 A 2/2012
CN 102514711 A 6/2012
(Continued)

OTHER PUBLICATIONS

Office Action issued in corresponding U.S. Appl. No. 17/603,185, dated Sep. 6, 2023.
(Continued)

*Primary Examiner* — Philip J Bonzell
(74) *Attorney, Agent, or Firm* — Young Basile Hanlon & MacFarlane, P.C.

(57) ABSTRACT

A multi-rotor aircraft includes a fuselage, a propulsion engine coupled to the fuselage that generates thrust to propel the aircraft along a first vector during forward flight, and rotors coupled to the fuselage, each rotor comprising blades, each rotor coupled to a motor, and each motor configured to supply power to and draw power from the coupled rotor. The aircraft includes a flight control system configured to control the motors coupled to the rotors in a power managed regime in which a net electrical power, consisting of a sum of the power being supplied to or drawn from each rotor by its motor, is maintained within a range determined by a feedback control system of the flight control system. The flight control system can also be leveraged to adjust rotor control inputs to modify at least one of thrust, roll, pitch, or yaw of the multi-rotor aircraft.

20 Claims, 12 Drawing Sheets

Related U.S. Application Data

(60) Provisional application No. 62/839,086, filed on Apr. 26, 2019.

(51) Int. Cl.

| | | |
|---|---|---|
| *B64C 27/00* | (2006.01) | |
| *B64C 27/02* | (2006.01) | |
| *B64C 27/12* | (2006.01) | |
| *B64C 27/14* | (2006.01) | |
| *B64C 27/22* | (2006.01) | |
| *B64C 27/26* | (2006.01) | |
| *B64D 31/00* | (2006.01) | |
| *G05D 1/00* | (2006.01) | |
| *B64C 11/48* | (2006.01) | |
| *B64C 27/82* | (2006.01) | |
| *B64D 27/24* | (2006.01) | |
| *H02K 1/27* | (2022.01) | |

(52) U.S. Cl.
CPC .......... *B64C 27/021* (2013.01); *B64C 27/025* (2013.01); *B64C 27/027* (2013.01); *B64C 27/028* (2013.01); *B64C 27/10* (2013.01); *B64C 27/12* (2013.01); *B64C 27/14* (2013.01); *B64C 27/22* (2013.01); *B64C 27/26* (2013.01); *B64D 31/00* (2013.01); *B64C 11/48* (2013.01); *B64C 2027/8236* (2013.01); *B64D 27/24* (2013.01); *H02K 1/27* (2013.01)

(58) Field of Classification Search
CPC ......... B64C 11/50; B64C 27/14; B64C 27/26; B64C 29/0025; B64C 27/025; B64C 2201/027; B64U 10/14; B64U 30/24; B64U 50/23
See application file for complete search history.

(56) References Cited

U.S. PATENT DOCUMENTS

| | | | |
|---|---|---|---|
| 5,935,177 A | 8/1999 | Cox et al. | |
| 6,886,776 B2 | 5/2005 | Wagner et al. | |
| 8,393,465 B2 | 3/2013 | Clark et al. | |
| 8,453,962 B2 | 6/2013 | Shaw | |
| 8,485,464 B2 | 7/2013 | Kroo | |
| 9,120,560 B1 | 9/2015 | Armer et al. | |
| 9,527,588 B1 | 12/2016 | Rollefstad | |
| 9,663,237 B2 | 5/2017 | Senkel et al. | |
| 9,764,833 B1* | 9/2017 | Tighe .................. | B64D 13/006 |
| 9,767,701 B2 | 9/2017 | Navot et al. | |
| 9,934,694 B2 | 4/2018 | Navot et al. | |
| 10,046,853 B2* | 8/2018 | Vander Mey ........... | B64C 27/08 |
| 10,053,213 B1 | 8/2018 | Tu | |
| 10,259,563 B2* | 4/2019 | Long ...................... | H02K 7/14 |
| 10,364,024 B2 | 7/2019 | Tighe et al. | |
| 10,364,036 B2 | 7/2019 | Tighe et al. | |
| 10,370,099 B2 | 8/2019 | Mahboubi et al. | |
| 10,410,527 B2 | 9/2019 | Navot et al. | |
| 10,494,088 B1* | 12/2019 | Coralic .................. | B64U 30/20 |
| 10,583,912 B2* | 3/2020 | Long ...................... | B64C 11/02 |
| 10,737,766 B2 | 8/2020 | Mores et al. | |
| 10,752,372 B2 | 8/2020 | Senkel et al. | |
| 10,984,663 B2 | 4/2021 | Navot et al. | |
| 11,027,836 B2* | 6/2021 | Lacy ....................... | B64U 50/19 |
| 11,034,441 B2 | 6/2021 | Mahboubi et al. | |
| 11,052,998 B2 | 7/2021 | Mores et al. | |
| 11,174,019 B2* | 11/2021 | Moore ...................... | B64C 9/02 |
| 11,220,325 B2 | 1/2022 | Kiesewetter et al. | |
| 11,267,571 B2* | 3/2022 | Moore ...................... | B64C 9/02 |
| 11,292,593 B2* | 4/2022 | Moore ..................... | G05D 1/0858 |
| 11,358,712 B2 | 6/2022 | Tighe et al. | |
| 11,358,713 B2 | 6/2022 | Tighe et al. | |
| 11,628,927 B2 | 4/2023 | Yuksel | |
| 11,628,933 B2* | 4/2023 | Weekes ............... | B64C 29/0025 |
| | | | 244/6 |
| 2002/0195518 A1 | 12/2002 | Killingsworth | |
| 2004/0245374 A1 | 12/2004 | Morgan | |
| 2006/0266881 A1 | 11/2006 | Hughey | |
| 2008/0169375 A1 | 7/2008 | Ishikawa | |
| 2009/0008499 A1 | 1/2009 | Shaw | |
| 2009/0145998 A1 | 6/2009 | Salyer | |
| 2010/0044499 A1 | 2/2010 | Dragan et al. | |
| 2012/0068006 A1 | 3/2012 | Jones | |
| 2012/0091259 A1 | 4/2012 | Morris et al. | |
| 2012/0168568 A1 | 7/2012 | Sonneborn | |
| 2013/0049364 A1 | 2/2013 | Teets et al. | |
| 2013/0062455 A1 | 3/2013 | Lugg et al. | |
| 2013/0092799 A1 | 4/2013 | Tian et al. | |
| 2013/0214086 A1 | 8/2013 | Kroo | |
| 2014/0034774 A1 | 2/2014 | Ferrier et al. | |
| 2014/0061366 A1 | 3/2014 | Fink et al. | |
| 2014/0097290 A1 | 4/2014 | Leng | |
| 2014/0158815 A1 | 6/2014 | Renteria | |
| 2015/0012154 A1 | 1/2015 | Senkel et al. | |
| 2015/0115108 A1 | 4/2015 | Benson et al. | |
| 2016/0023751 A1 | 1/2016 | Lee et al. | |
| 2016/0052618 A1 | 2/2016 | Norden | |
| 2016/0052626 A1* | 2/2016 | Vander Mey ........... | B64C 37/00 |
| | | | 244/6 |
| 2016/0196755 A1 | 7/2016 | Navot et al. | |
| 2016/0207625 A1 | 7/2016 | Judas et al. | |
| 2016/0236775 A1* | 8/2016 | Eshkenazy .......... | B64C 29/0025 |
| 2016/0347447 A1 | 12/2016 | Judas et al. | |
| 2017/0183081 A1 | 6/2017 | Du et al. | |
| 2017/0263136 A1 | 9/2017 | Navot et al. | |
| 2017/0267367 A1 | 9/2017 | Senkel et al. | |
| 2017/0274979 A1* | 9/2017 | Beckman ................ | B64C 27/80 |
| 2017/0274983 A1* | 9/2017 | Beckman .............. | B64C 11/003 |
| 2017/0274984 A1* | 9/2017 | Beckman ................ | B64C 11/48 |
| 2018/0044029 A1* | 2/2018 | Koegler .................. | B64C 11/48 |
| 2018/0081351 A1 | 3/2018 | Tankersley et al. | |
| 2018/0105267 A1 | 4/2018 | Tighe et al. | |
| 2018/0105268 A1* | 4/2018 | Tighe ................. | B64C 29/0025 |
| 2018/0105279 A1 | 4/2018 | Tighe et al. | |
| 2018/0190133 A1 | 7/2018 | Navot et al. | |
| 2018/0215465 A1* | 8/2018 | Renteria ................. | B64C 25/10 |
| 2018/0244367 A1 | 8/2018 | Kiesewetter et al. | |
| 2018/0281949 A1* | 10/2018 | Mitchell ................. | B64C 27/32 |
| 2018/0334241 A1* | 11/2018 | Long ....................... | H02K 7/14 |
| 2019/0009895 A1* | 1/2019 | Tu ....................... | B64C 29/0025 |
| 2019/0127056 A1* | 5/2019 | Weekes ..................... | B64D 9/00 |
| 2019/0185140 A1* | 6/2019 | Long ...................... | B64D 35/02 |
| 2019/0202546 A1 | 7/2019 | Mahboubi et al. | |
| 2019/0241259 A1 | 8/2019 | Tsutsumi et al. | |
| 2019/0322364 A1 | 10/2019 | Tighe et al. | |
| 2020/0013298 A1 | 1/2020 | Navot et al. | |
| 2020/0017204 A1* | 1/2020 | Lacy ...................... | B64U 10/13 |
| 2020/0031461 A1 | 1/2020 | Mahboubi et al. | |
| 2020/0283134 A1 | 9/2020 | Mores et al. | |
| 2021/0107626 A1 | 4/2021 | Yuksel | |
| 2021/0362847 A1 | 11/2021 | Mahboubi et al. | |
| 2022/0009626 A1* | 1/2022 | Baharav ................. | B64D 27/24 |
| 2023/0025665 A1 | 1/2023 | Tighe et al. | |
| 2023/0026170 A1 | 1/2023 | Tighe et al. | |

FOREIGN PATENT DOCUMENTS

| | | | | |
|---|---|---|---|---|
| CN | 108327899 A | * | 7/2018 | |
| CN | 109398725 A | | 3/2019 | |
| CN | 112319786 A | | 2/2021 | |
| CN | 113184167 A | * | 7/2021 | ............ B64C 11/48 |
| DE | 102005010336 A1 | | 5/2006 | |
| DE | 102006021182 A1 | | 11/2007 | |
| DE | 102012202698 A1 | | 8/2013 | |
| GB | 2468787 A | | 9/2010 | |
| GB | 2498406 B | | 2/2014 | |
| JP | 3677748 B1 | | 8/2005 | |
| KR | 20140034370 A | | 3/2014 | |
| WO | 2008147484 A2 | | 12/2008 | |
| WO | 2011140551 A1 | | 11/2011 | |
| WO | 2013124300 A1 | | 8/2013 | |
| WO | 2014053057 A1 | | 4/2014 | |

(56) References Cited

FOREIGN PATENT DOCUMENTS

WO     WO-2017043980 A1 *   3/2017  ............. B64C 11/48
WO         2020122077 A1     6/2020

OTHER PUBLICATIONS

Office Action issued in corresponding U.S. Appl. No. 17/603,199, dated Jan. 2, 2024.

* cited by examiner

HYBRID GYRODYNE AIRCRAFT

CROSS-REFERENCE TO RELATED APPLICATION(S)

This application is a continuation of International Patent Application Serial No. PCT/US2020/027590, filed Apr. 10, 2020, which claims priority to U.S. Provisional Application Ser. No. 62/839,086, filed Apr. 26, 2019, the entire disclosures of which are incorporated herein.

TECHNICAL FIELD

This disclosure relates generally to aircraft that use rotary wings (rotors) to provide lift such as helicopters, multicopters, gyrocopters, and/or gyrodyne aircraft and specifically to improvements in flight control for rotary-wing aircraft.

BACKGROUND

A gyrodyne aircraft consists of a fuselage with one or more propulsion power sources (ICE jet/propeller), one or more rotors that provide additional powered lift during vertical takeoff and landing and often fixed wings and/or standard aircraft control surfaces for normal cruise flight. These rotors are basically unpowered during the balance of the flight and may be the sole lifting surfaces by autorotation, be used to augment the lift of other winged surfaces or be slowed to reduce drag while relying mostly/solely on the lift of other winged surfaces. Autorotation is an aerodynamic state of a rotor where the only power applied to the rotor is from the airflow through the rotor, which provides the rotational power, and the resulting rotation of the blades provides lift.

The purported advantage of a gyrodyne versus a helicopter is to provide a less complex vertical lifting system generally not requiring the expensive variable pitch rotors and complex maintenance-prone swash plate for collective and pitch control while providing a higher cruise speed. Higher cruise speed is accomplished by using separate dedicated propulsion engines with reduced drag by relying on other wing surfaces and/or reduced RPM of rotor surfaces.

While any number of rotors can be used in a gyrodyne, historically it has been just one rotor. Gyrodynes that use one rotor do not typically require a compensating torque device such as the tail rotors found on helicopters because torque is not applied between the aircraft and the rotor in flight. For example, ram jets on the wing tips were used on the 1950-60's Fairley Rotodyne and similarly tip jets in the early 2000's DARPA— Groen Brothers Heliplane project. The Carter Copter uses a high inertia rotor at a flat (no lift) pitch spun up on the ground (due to friction with the ground the applied torque will not spin the aircraft. Then the spin force (torque) is disconnected, the pitch is quickly increased resulting in a high "jump takeoff" lift for a short period of time while the aircraft transitions to forward flight. For landing, the rotor is set to high RPM by autorotation during the approach and the inertia of the rotor provides enough energy to provide a pitch controlled soft/vertical landing.

Autorotation is also used to provide lift as an emergency landing method for helicopters in the event of power failure to the rotor(s).

SUMMARY

Disclosed herein are implementations of a multi-rotor or gyrodyne aircraft.

In a first aspect, an aircraft includes a fuselage; a propulsion engine coupled to the fuselage and configured to generate thrust to propel the aircraft along a first vector during forward flight; coaxial pairs of rotors coupled to the fuselage, each rotor comprising blades, each rotor coupled to a motor, and each motor configured to supply power to and draw power from the coupled rotor; and a flight control system configured to control the motors such that blades of first and second rotors in a coaxial pair of rotors are offset about an axis of rotation by approximately ninety degrees during forward flight.

In the first aspect, a pitch angle of a rotor plane for each of the rotors behind a center of gravity of the aircraft can be increased relative to a pitch angle of a rotor plane for each of the rotors forward of the center of gravity of the aircraft. Each rotor can comprise two blades extending from a rotor hub in opposite directions. At least one coaxial pair of rotors can be configured to be driven by its corresponding motors during forward flight to provide lift to the aircraft along a second vector during forward flight. The flight control system can be configured to control the corresponding motors of the at least one coaxial pair of rotors configured to be driven during forward flight in a power managed regime in which a net electrical power, consisting of a sum of the power being supplied to or drawn from each rotor by its motor, is maintained within a range determined by a feedback control system of the flight control system. The power being supplied to or drawn from each rotor by its corresponding motor can adjust a rotational frequency of the rotor to provide attitude control for the aircraft. The flight control system can be configured to control the motors such that the blades of the first and second rotors in the coaxial pair of rotors rotate in the same direction about the axis of rotation. The aircraft can include wings extending from opposite sides of the fuselage and configured to provide lift to the aircraft along a second vector during forward flight. Lift provided by the wings to the aircraft along the second vector during forward flight can be greater than or equal to lift provided by the coaxial pairs of rotors to the aircraft above a predetermined airspeed during forward flight. A center of lift of the wings can be at or behind a center of gravity of the aircraft. The first vector can be substantially perpendicular to a force of gravity acting on the aircraft and the second vector is substantially parallel to the force of gravity acting on the aircraft. The aircraft can include a horizontal stabilizer supported by the fuselage and configured to provide lift to the aircraft along a second vector during forward flight. The lift provided by the horizontal stabilizer is configured to balance lift generated by the coaxial pairs of rotors in forward flight. A center of lift of the horizontal stabilizer is offset from a center of gravity of the aircraft. A moment from the center of lift of the horizontal stabilizer in forward flight can be opposite in direction to a moment from a center of propulsion thrust offset from a center of drag. The horizontal stabilizer can be configured to balance both the lift generated by the coaxial pairs of rotors in forward flight and the combined moments from a center of propulsion thrust offset from a center of drag in forward flight. In the first aspect, the various described features can be present independently or together.

In a second aspect, an aircraft includes a fuselage; a propulsion engine coupled to the fuselage and configured to generate thrust to propel the aircraft along a first vector during forward flight; and rotors coupled to the fuselage. The rotors are configured to provide lift to the aircraft along a second vector during forward flight. Each rotor includes a rotor hub defining a motor cavity; a motor disposed within the motor cavity of the rotor hub, the motor configured to supply power to and draw power from the rotor; and blades integral with and extending from the rotor hub in opposite directions, each blade having a fixed pitch. The aircraft also includes a flight control system configured to control the motors of the corresponding rotors configured to be driven during forward flight in a power managed regime in which a net electrical power, consisting of a sum of the power being supplied to or drawn from each rotor by its motor, is maintained within a range determined by a feedback control system of the flight control system.

In the second aspect, each rotor can include a rotor bearing shaft extending from the rotor hub, through the motor cavity, and though the motor; and a shaft cover extending from the motor, around the rotor bearing shaft, to a mounting flange. The shaft cover can have an airfoil shape. The motor can comprise magnets disposed in walls of the rotor hub and a housing disposed in the motor cavity and rotatable about the rotor bearing shaft. The housing can include the shaft cover extending from the housing to the mounting flange, one or more motor bearings that support the rotor bearing shaft, and stator windings disposed within the housing that interact with the magnets such that the motor operates as a brushless motor. The rotors can be coupled in coaxial pairs and the rotors in each coaxial pair can be controlled by corresponding motors to rotate in the same direction about an axis of rotation of the coaxial pair. The blades of first and second rotors in each coaxial pair can be offset about the axis of rotation by approximately ninety degrees. Wings extending from opposite sides of the fuselage can be configured to provide lift to the aircraft along the second vector during forward flight, wherein the rotors are coupled to the wings. Each of the rotors can be inclined at an angle in respect to a horizontal plane, and an inclination of the angle can be such that operation of the rotor provides a yaw control moment resulting from a change in thrust due to a change in rotor rotational speed when the rotor operates near autorotation. The angle can measure between four and six degrees. Power being supplied to or drawn from each rotor by its corresponding motor can adjust a rotational frequency of the rotor to provide attitude control for the aircraft. In the second aspect, the various described features can be present independently or together.

In a third aspect, a method of flight control for a multi-rotor aircraft having at least five rotors each coupled to a motor is disclosed. The method includes converting, using a processing unit, at least one of a thrust, roll, pitch, or yaw control input for the multi-rotor aircraft to a rotor control input for at least one of the rotors; determining, by the processing unit, effective thrust generated by the at least five rotors based on the rotor control input; when a minimum or maximum rotor control value would be exceeded based on the rotor control input, adjusting, by the processing unit, the rotor control input based on redundancy in two of the at least five rotors such that the effective thrust remains unchanged; and sending a command, from the processing unit to one or more of the motors, to implement the adjusted rotor control input to modify at least one of thrust, roll, pitch, or yaw of the multi-rotor aircraft.

In the third aspect, the multi-rotor aircraft can include eight rotors and redundancy can be present for four of the eight rotors. The multi-rotor aircraft can include eight rotors with four rotors located on the first diagonal and four rotors located on the second diagonal. Adjusting the rotor control input based on redundancy can include one of addition or subtraction of an adjustment value to rotor control inputs for rotors on a first diagonal and the other of addition or subtraction of the adjustment value to rotor control inputs for rotors on a second diagonal offset from the first diagonal. The multi-rotor aircraft can include a propulsion engine coupled to a fuselage and configured to generate thrust to propel the multi-rotor aircraft along a first vector during forward flight; wherein the at least five rotors are coupled to the fuselage and configured to provide lift to the multi-rotor aircraft along a second vector during forward flight, wherein each motor is configured to supply power to and draw power from a corresponding coupled rotor; and a flight control system configured to control the motors coupled to the rotors in a power managed regime in which a net electrical power, consisting of a sum of the power being supplied to or drawn from each rotor by its motor, is maintained within a range determined by a feedback control system of the flight control system. In the third aspect, the various described features can be present independently or together.

In a fourth aspect, an aircraft includes a fuselage; a propulsion engine coupled to the fuselage and configured to generate thrust to propel the aircraft along a first vector during forward flight; and rotors coupled to the fuselage and configured to provide lift to the aircraft along a second vector during forward flight. Each rotor includes blades, is coupled to a motor, and each motor is configured to supply power to and draw power from the coupled rotor. Power being supplied to or drawn from each rotor by its corresponding motor adjusts a rotational frequency of the rotor to provide attitude control for the aircraft. Each of the rotors is inclined at an angle in respect to a horizontal plane. An inclination of the angle is such that operation of the rotor provides a yaw control moment resulting from a change in thrust due to a change in rotor rotational speed when the rotor operates near autorotation.

In the fourth aspect, the angle can measure between three and seven degrees. The rotors can be coupled in coaxial pairs and the rotors in each coaxial pair can be controlled by corresponding motors to rotate in the same direction about an axis of rotation of the coaxial pair. The aircraft can include a flight control system configured to control the motors coupled to the rotors in a power managed regime in which a net electrical power, consisting of a sum of the power being supplied to or drawn from each rotor by its motor, is maintained within a range determined by a feedback control system of the flight control system. In the fourth aspect, the various described features can be present independently or together.

In a fifth aspect, an aircraft includes a fuselage; a propulsion engine coupled to the fuselage and configured to generate thrust to propel the aircraft along a first vector during forward flight; wings extending from the fuselage and configured to provide lift to the aircraft along a second vector during forward flight, wherein a center of lift of the wings is at or behind a center of gravity of the aircraft; and rotors coupled to the wings. At least some of the rotors are configured to provide lift to the aircraft along a second vector during forward flight. A pitch angle of a rotor plane for each of the rotors behind a center of gravity of the aircraft is increased relative to a pitch angle of a rotor plane for each of the rotors forward of the center of gravity of the aircraft.

In the fifth aspect, lift provided by the wings to the aircraft along the second vector during forward flight can be greater than or equal to lift provided by the rotors to the aircraft above a predetermined airspeed during forward flight. Each rotor can include a rotor hub defining a motor cavity; a motor disposed within the motor cavity of the rotor hub, the motor configured to supply power to and draw power from the rotor; and blades integral with and extending from the rotor hub in opposite directions, each blade having a fixed pitch. The rotors can be coupled in coaxial pairs and the rotors in each coaxial pair can be controlled by corresponding motors to rotate in the same direction about an axis of rotation. In the fifth aspect, the various described features can be present independently or together.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A multi-rotor gyrodyne aircraft includes at least one propulsion engine configured to provide forward thrust to propel the aircraft along a first vector during forward flight and multiple rotors configured to provide lift to the aircraft along a second vector during forward flight. The gyrodyne aircraft also includes a flight control system configured to control the rotors to operate during forward flight in a power-managed regime in which a net electrical power, consisting of the sum of the power being supplied to or drawn from each rotor by its motor, is maintained within a range determined by a feedback control system of the flight control system. Additional features that improve operation efficiency and control of the gyrodyne aircraft are described herein.

Figure 1:
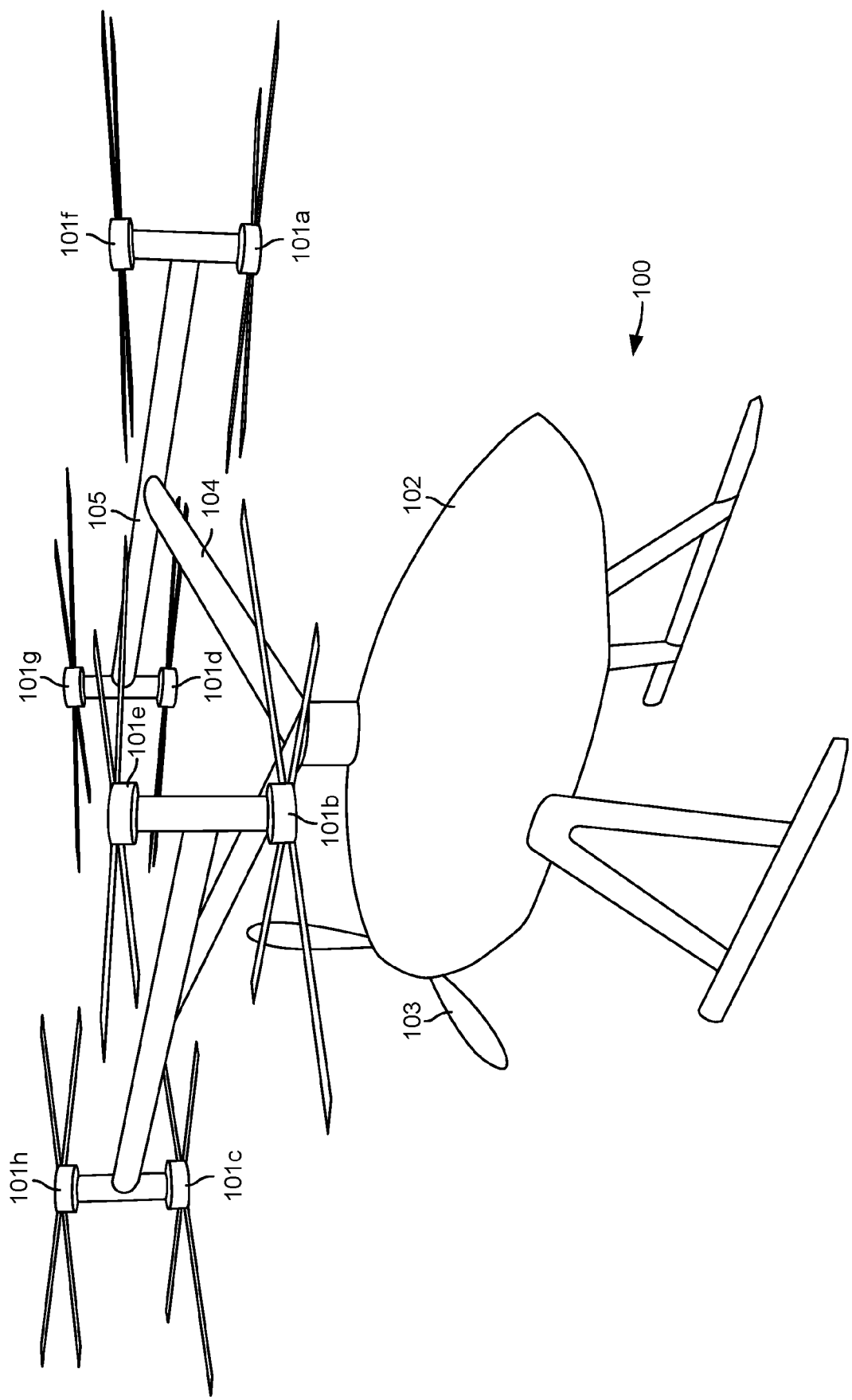
FIG. 1 shows a perspective view of an embodiment with eight 4-blade rotors and a pusher propeller.

FIG. 1 shows a first embodiment of the hybrid gyrodyne aircraft 100 consisting of eight rotors 101a-h each driven by an electric motor/generator, a fuselage 102 with propulsion propeller 103 coupled to the fuselage 102 and supporting structures 104, 105 attached to the top of the fuselage 101 where the supporting structures 104, 105 couple the rotors 101a-h with their electric motors/generators to the fuselage 102. The fuselage 102 can hold cargo or other types of payload. Given the eight rotors 101a-h, the aircraft 100 does not require any additional lift or aircraft control surfaces (e.g. wings, rudders, ailerons, elevators). All flight control can be accomplished by electrical motor control of the RPM of the rotors 101a-h.

The rotors 101a-h provide redundancy for continued controlled flight to a safe landing in the event of rotor, motor, or electronic speed controller (ESC) failure. Further, the rotors 101a-h are configured in four coaxial pairs of rotors 101a/f, 101b/e, 101c/h, and 101d/g, and the airflow in forward flight through two rotors in a coaxial pair of rotors is independent, unlike when the aircraft operates in a hover and slow forward flight mode, where the airflow through two rotors in the coaxial pair of rotors is not independent. In some examples, the propulsion propeller 103 can be directly connected via a drive train to an ICE engine. In some examples, the rotors 101a-h are (semi) rigid, fixed pitch, and low inertia, and the rotors 101a-h do not have the hinged, pitch adjustable, high inertia of helicopter rotors.

Figure 2:
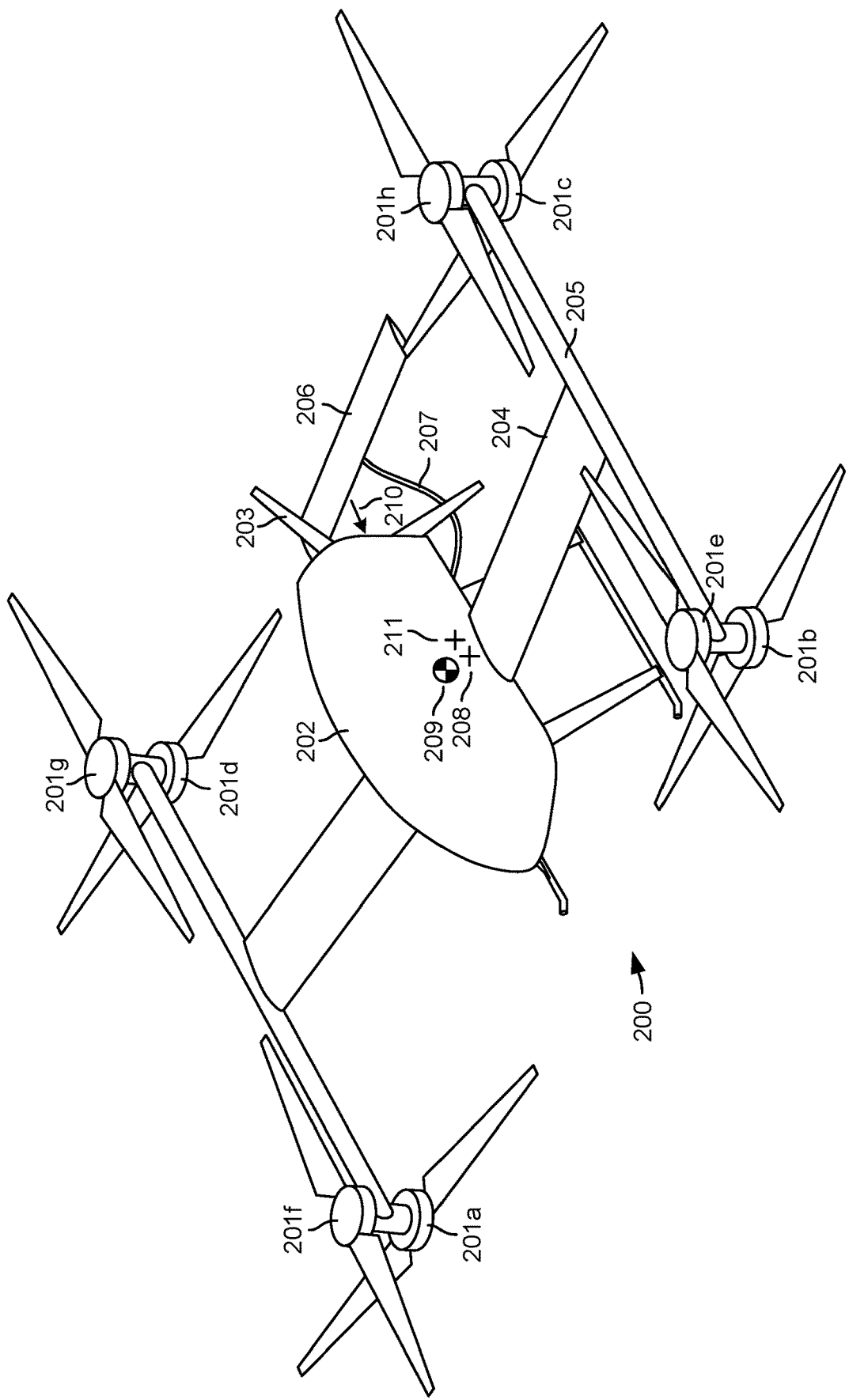
FIG. 2 shows a perspective view of an embodiment with eight 2-blade rotors, a pusher propeller, and a wing that couples the rotors to the fuselage.

FIG. 2 shows a second embodiment of the hybrid gyrodyne aircraft 200 that is similar to the hybrid gyrodyne aircraft 100 of FIG. 1. Most similarities are not described for sake of brevity. In terms of differences, the aircraft 200 consists of eight rotors 201a-h each driven by an electric motor/generator and having four blades. The aircraft 200 includes a fuselage 202 with a propulsion propeller 203 coupled to the fuselage 202. The aircraft 200 also includes supporting structures 204, 205 attached to the fuselage 202 where the supporting structures 204, 205 couple the rotors 201a-h with their electric motors/generators to the fuselage 202. The supporting structure 204 in FIG. 2 is a wing having an aerodynamic shape, with the wing attached to the side and/or bottom of the fuselage 202. In the example of FIG. 2, two wings are used, with the wings extending from opposite sides of the aircraft 200. The hybrid gyrodyne aircraft 200 of FIG. 2 also includes a horizontal stabilizer 206 supported behind the fuselage 202 using a supporting structure 207. The horizontal stabilizer 206 can have an aerodynamic shape such as an airfoil shape as shown. The supporting structure 207 may be formed as an elongated stanchion as shown, may take other shapes or forms, or may not be included in some examples, for example, when the horizontal stabilizer 206 is directly coupled to the fuselage 202.

In some examples (not shown), the aircraft 200 can consist of four rotors each having two blades, e.g., a single quadcopter configuration instead of a dual quadcopter configuration. In some examples (not shown), the supporting structure 204 (e.g., the wing) can be attached higher along the side or alternatively to the top of the fuselage 202. Improvements to aircrafts similar to the aircrafts 100, 200 are described herein while relying on the structures of aircrafts 100, 200 to describe implementation examples.

Wing to Improve Forward Flight Efficiency

For the following description, it is helpful to understand that a wing of a given airfoil has the characteristics of lift, drag, and pitching moment determined by the following equations:

$$\text{Lift} = 0.5 * Cl * \text{Density} * \text{Speed}^2 * \text{Area} \qquad (1)$$

$$\text{Drag} = 0.5 * Cd * \text{Density} * \text{Speed}^2 * \text{Area} \qquad (2)$$

$$\text{Moment} = 0.5 * Cm * \text{Density} * \text{Speed}^2 * \text{Area} * \text{Chord} \qquad (3)$$

where the lift coefficient Cl for the wing, overall drag coefficient Cd for the wing, and (pitching) moment coefficient Cm for the wing are a function of the wing's angle of attack (the angle between the chord line of the wing and the flight direction), Density is the density of air, Speed is the airspeed, and Area is the area of the wing. Cd includes the 2-dimension drag coefficient of the airfoil Cd_2D plus the induced drag based on the aspect ratio of the wing as given by the following equation:

$$Cd = Cd\_2D + Cl2/(\pi * e * \text{Aspect Ratio}) \qquad (4)$$

where it is approximately equal to 3.14159 and e is the Oswald efficiency number with a typical value of 0.8. The pitching moment in equation (3) is generally a nose down force.

In the embodiment of the aircraft 100 shown in FIG. 1, in high speed (or cruise) forward flight, the center of drag for the aircraft 100 is significantly above the center of propulsion thrust since much of the drag is due to the rotors 101a-h which are located much higher than the propulsion propeller 103. This results in a nose up pitching moment that is compensated by the flight controller to maintain pitch attitude by reducing the rotational speed of the front rotors 101a,b,e,f to decrease thrust and by increasing the rotational speed of the rear rotors 101c,d,g,h to increase thrust. The rear rotors 101c,d,g,h are required to generate more lift than the front rotors 101a,b,e,f to compensate for the nose up pitching moment, and thus the rear rotors 101c,d,g,h operate short of autorotation, which requires input of electric power, and the front rotors 101a,b,e,f operate past autorotation, generating power, which is less efficient than if all the rotors 101a-h provide approximately the same amount of lift and operate at approximately the same point relative to autorotation in forward flight.

Figure 10:
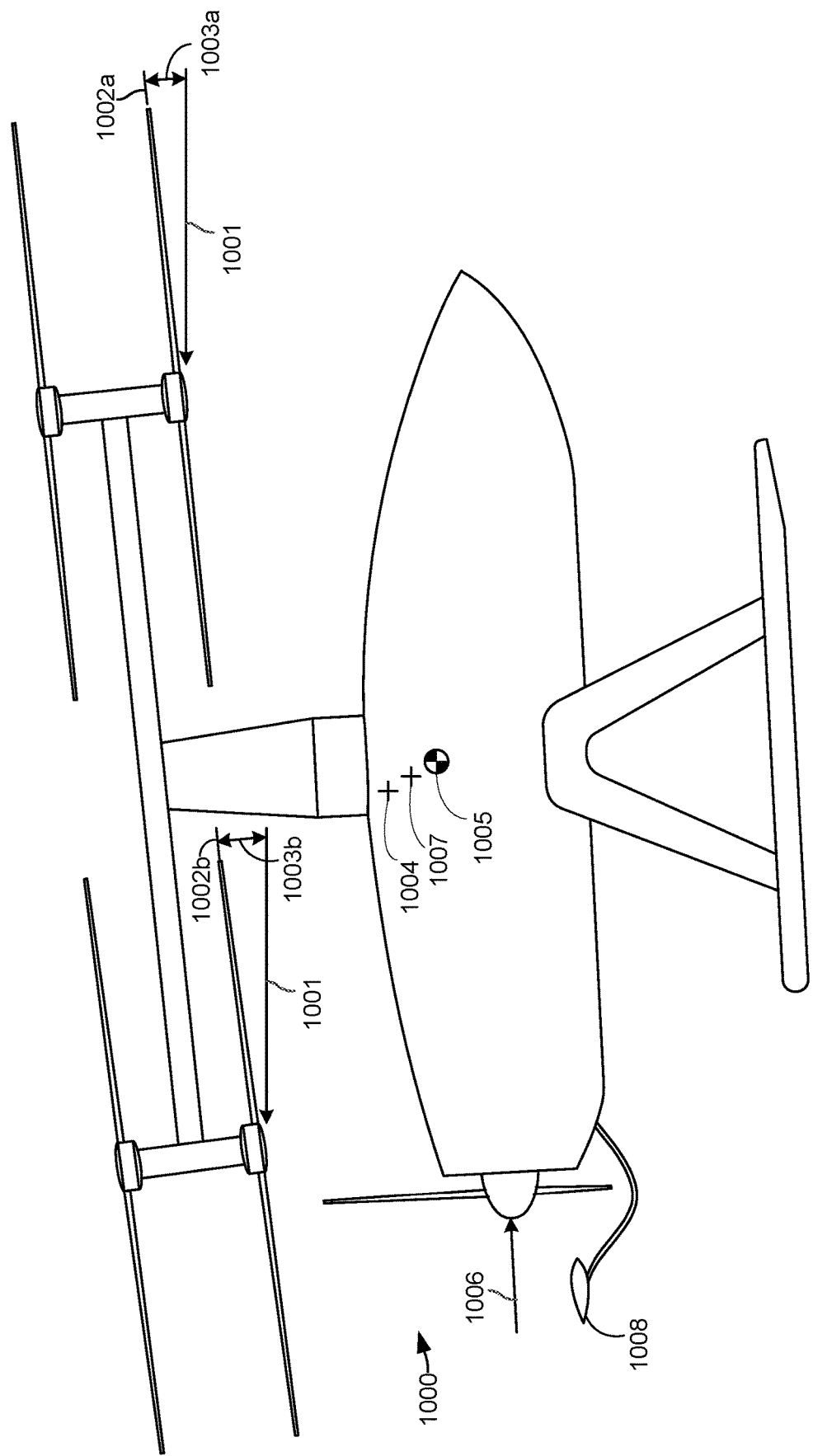
FIG. 10 shows a side view of the aircraft in FIG. 1 with a relatively high angle of attack in forward flight relative to a rotor plane of a front rotor.

FIG. 10 shows a gyrodyne aircraft 1000 in forward flight with a relative airflow direction 1001, rotor planes 1002a,b extending perpendicular to blade axes (not numbered), and angles of attack 1003a,b. At a given airspeed, the amount of lift provided by a rotor operating near autorotation is generally increased by increasing the angles of attack 1003a,b of the rotor planes 1002a,b as demonstrated in the data shown in FIG. 8, which was data measured with a 30-inch diameter rotor at a forward airspeed of 60 miles per hour. The pitch angle (angle of attack 1003b) of the rotor plane 1002b of the rear rotors can be increased relative to the pitch angle (angle of attack 1003a) of the front rotors such that both the front and rear rotors are at different angles of attack 1003a,b but are in autorotation at the same time. In addition, the rear rotors generate additional lift compared to the front rotors which is necessary to compensate for the nose-up pitching moment generated from the propulsion thrust given the rotor configuration.

Another approach to compensate for the nose-up pitching moment is to add a wing, for example, serving as part of the structure 104 in FIG. 1 or the structure 204 in FIG. 2, that couples the rotors to the fuselage. The wing is configured to cause the lift generated by the front rotors to be approximately the same as the rear rotors in forward flight. To achieve this, the center of lift 208 in FIG. 2, 1004 in FIG. 10 of the wing is placed behind the center of gravity 209 in FIG. 2, 1005 in FIG. 10 to generate a nose-down pitching moment, and the wing may also provide a nose-down pitching moment based on the pitching moment coefficient. Preferably, the selected airfoil would have a relatively high pitching moment. These two forces together will counteract the nose-up pitching moment due to the offset between the location where propulsion thrust is generated (center of propulsion thrust 210 in FIG. 2, 1006 in FIG. 10) and the center of drag 211 in FIG. 2, 1007 in FIG. 10 of the aircraft if the choice of the airfoil, size, location, and angle of attack of the wing are selected to meet the following equation involving the various pitching moments:

$$\text{Lift} * \text{HdistWing2} CG + \text{Moment} = \text{PropThrust} * \text{VdistPthrst2} CG \qquad (5)$$

Where Lift is the lift generated by the wing as defined in equation (1), HdistWing2CG is the horizontal distance between the center of lift 208, 1004 of the wing and the aircraft center of gravity 209, 1005, Moment is the nose-down pitching moment of the wing as defined in equation (3), PropThrust is the thrust generated by the propulsion, and VdistPthrst2CG is the vertical distance between a centerline of the propulsion thrust 210, 1006 and the aircraft center of drag 211, 1007 where the center of drag 211, 1007 includes the drag of the wing as defined in equation (2).

This approach of adding a wing with a center of lift 208, 1004 behind a center of gravity 209, 1005 of the aircraft 200, 1000 can be combined with the approach of increasing a pitch angle 1003b of the rotor planes of the rear rotors relative to the front rotors such that the combination of these two approaches counteracts the nose-up pitching moment due to the center of propulsion thrust 210, 1006 being below the center of drag 211, 1007 and the front and rear rotors simultaneously operating near autorotation. Each approach can also be used independently to counteract the nose-up pitching moment.

Another approach to compensate for the nose-up pitching moment is to use a horizontal stabilizer 206, 1008 configured with an appropriate selection of size and shape, airfoil type, location, and angle of the horizontal stabilizer to balance the moment generated in forward flight resulting from the center of drag 211, 1007 for the aircraft 200, 1000 being significantly offset (above or below) from the center of propulsion thrust 210, 1006, or alternatively, configured to cause the lift generated by the front rotors to be approximately the same as the lift generated by the rear rotors in forward flight or to balance the moment resulting from lift generated by the front rotors to be different than the lift generated by the rear rotors in forward flight. The horizontal stabilizer 206, 1008 may be placed toward the rear of the aircraft, or toward the front of the aircraft, and may be combined with or replace use of a wing to balance the pitching moment. The equivalent of a horizontal stabilizer may be implemented with a V-shaped tail located toward a rear of the aircraft to additionally provide the equivalent of a vertical stabilizer to provide aerodynamic stability to the yaw axis (heading) of the aircraft 200, 1000. Alternatively, two smaller horizontal stabilizers may be placed at ends of horizontal booms pairs. Depending on a location of the horizontal stabilizer(s) 206, 1008, the propulsion engine with the propulsion propeller can alternatively be placed in the front of the fuselage.

In the embodiment shown in FIG. 2, in high speed (or cruise) forward flight, the rotors 201a-h are located so that the center of drag for the aircraft 200 is approximately the same as the center of propulsion thrust. Locating the rotors 201a-h in this manner can reduce or eliminate the nose-up pitching moment associated with the aircraft 100 shown in FIG. 1. In the aircraft 200 of FIG. 2, the position of the wing, e.g. structure 204, is located such that the center of lift generated by the wing is approximately the same as the center of gravity for the aircraft 200. As in the previous example, care must be taken to make sure the choice of the airfoil, size, location, and angle of attack of the wing results in balancing the pitching moments so that all the rotors 201a-h provide approximately the same amount of lift and operate at approximately the same point relative to autorotation in forward flight. Preferably the selected airfoil would have a low pitching moment. The embodiment of FIG. 2 also includes the horizontal stabilizer 206 that further serves to reduce or eliminate any nose-up pitching moment. The horizontal stabilizer 206 of FIG. 2 could also be used with the aircraft 100 of FIG. 1.

In either of the two embodiments of the aircrafts 100, 200 described above where a wing and/or a horizontal stabilizer is included, a significant reduction in drag is achieved by designing the wing and/or the horizontal stabilizer to provide a significant part of the lift in high speed (cruise) forward flight where the rotors 101a-h, 201a-h operate in autorotation at a lower angle of attack of the respective rotor planes.

Table 1 illustrates the reduction in drag for the rotors 201a-h and the supporting structure 204 for an 800-pound version of the aircraft 200 shown in FIG. 2 that is cruising at 100 miles per hour where all rotors 201a-h are 8 feet in diameter operating in autorotation. Three cases are shown where 1) the supporting structure 204 is a 5-inch diameter cylinder (cylindrical strut), 2) where a fairing is added to the cylindrical supporting structure 204 and does not generate lift (aerodynamic strut), and 3) where the supporting structure 204 is a wing with a 25-inch chord that generates 50 percent of the lift (e.g., a wing strut). Note, this table does not include the drag of the components of the aircraft 200 such as the fuselage 202, landing skids, etc. All values in table 1 are in pounds of force.

TABLE 1

|  | Cylindrical Strut | Aerodynamic Strut | Wing Strut |
| --- | --- | --- | --- |
| Lift from rotors | 800 | 800 | 400 |
| Lift from wing/strut | 0 | 0 | 400 |
| Drag from rotors | 66.8 | 66.8 | 24.6 |
| Drag from wing/strut | 319.7 | 16.1 | 21.3 |
| Total Drag | 386.5 | 82.9 | 45.9 |

Figure 3:
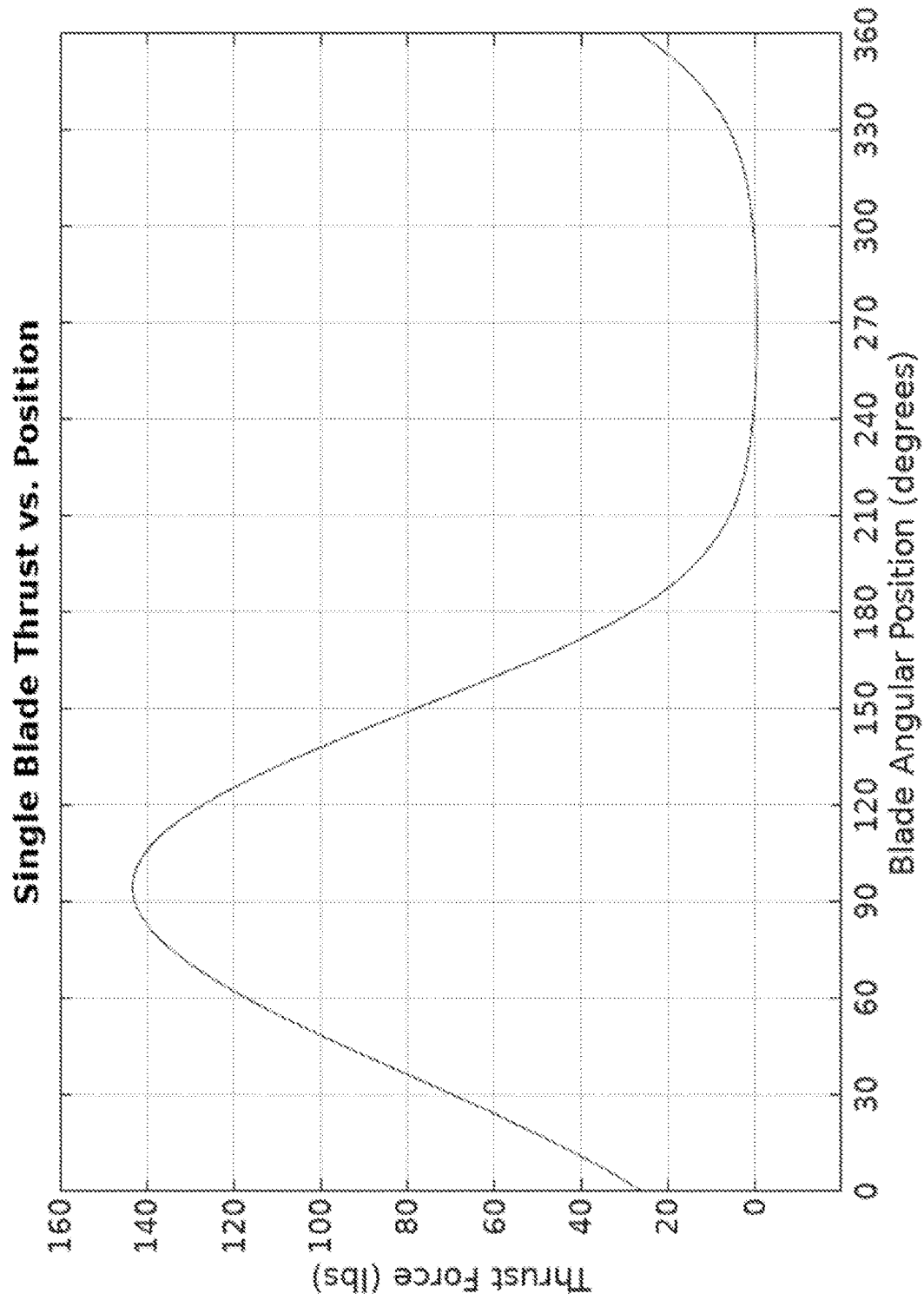
FIG. 3 shows a graph of thrust force vs. blade angular position on a single blade in autorotation forward flight vs. the blade rotational position.

FIG. 3 shows the relationship between the thrust force generated by a single blade of a rotor and the rotational position of the blade. The blade is pointed in the direction of forward flight when the angular position is 0 degrees and is advancing in the direction of forward flight at 90 degrees. Thus as seen in FIG. 3, rotors provide most or all of the lift only on one side of the rotor plane in forward flight and the force on an individual blade varies significantly for each rotation. Thus, a second advantage of adding a wing is it significantly reduces the load on the rotor blades, rotor hub, and rotor shaft bearings, resulting in the ability to use a lighter blade, rotor hub, and rotor shaft in an aircraft since the maximum loads are reduced.

Synchronized Rotors to Reduce Vibration in Forward Flight

Figure 4:
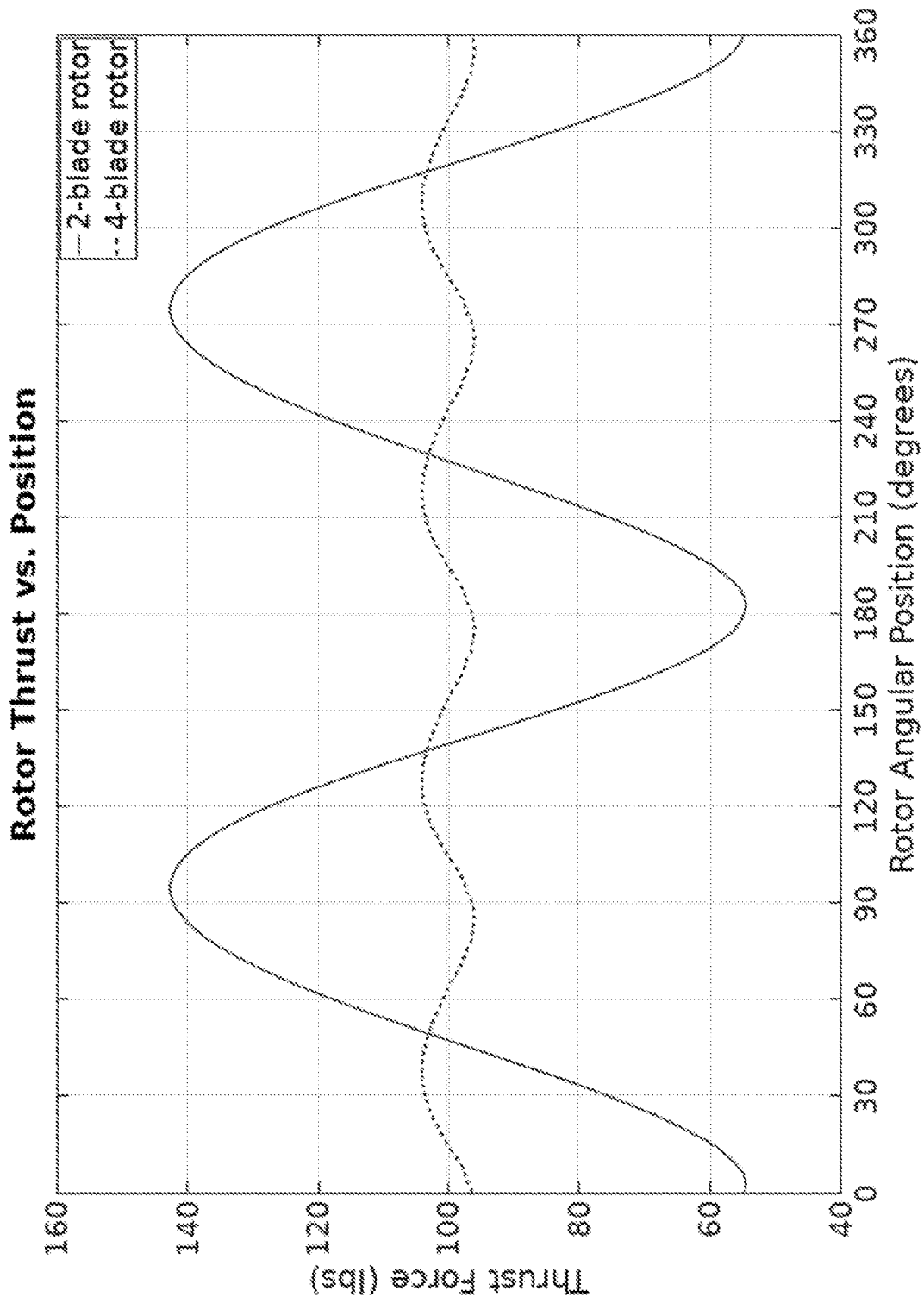
FIG. 4 shows a graph of lift force vs. rotor angular position for a 2-blade and a 4-blade rotor in autorotation forward flight.

In forward flight, the lift of a rotor varies with the rotation of the rotor blades from 0 to 360 degrees, resulting in vibration along the second vector during forward flight. FIG. 4 illustrates the variation in lift for a 2-blade rotor (solid trace) and a 4-blade rotor (dashed trace) that are both 8 feet in diameter in 100 mile per hour forward flight and in autorotation generating an average of 100 pounds of lift. The advantage of increasing the number of blades is clearly seen as the variation in lift is approximately 88 pounds-force for the 2-blade rotor and approximately 8 pounds-force for the 4-blade rotor.

For a number of reasons, it is desirable to use a 2-blade rotor, including reduced weight, higher strength, reduced cost, and 2-blade rotors are more compact when the aircraft is stored. The low vibration level of a 4-blade rotor can be achieved with 2-blade rotors if configured in coaxial pairs where the pair of 2-blade coaxial rotors are synchronized (phase-locked) at a 90-degree offset in angle as shown in FIG. 2, for example, the coaxial rotor pair 201b and 201e, when operating in forward flight. The offset may be set to an angle other than 90 degrees to achieve maximum thrust efficiency at forward flight speeds below cruise flight and in hover.

A phase-locked control loop is used to synchronize a periodic signal or rotating object being controlled in frequency (or rotational speed) by the control loop to a reference periodic signal or reference rotating object by comparing the difference in phase to generate an error signal. The error signal may also include the error in frequency. The phase-locked control loop adjusts the frequency based on the error signal until it matches the frequency and phase of the reference. The phase-locked control loop can be designed to adjust the frequency to achieve a certain phase difference, such as 90 degrees.

A phase-locked control loop can be used to synchronize the rotors of a coaxial pair of rotors. The rotational speed of a first of the two rotors of the coaxial pair could be controlled by the flight controller, while the rotational speed of the second could be synchronized to a particular phase difference (or offset angle around a shared rotational axis of the rotors) relative to the first rotor by the phase-locked control loop. Alternatively, both rotors could be controlled by the flight controller and the phase-locked control loop could provide a correction signal to the second rotor to achieve synchronization to a particular phase difference or offset angle around the common rotational axis. An ESC connected to each motor driving a respective rotor can provide the control of the rotor speed based on the flight controller and the phase-locked loop error signal.

The phase-locked control loop controlling the motors and rotors of the coaxial rotor pair requires sensing the rotor positions in order to generate a phase error signal and synchronize the rotor pairs. Position sensing can be accomplished in a number of different ways. One method is to use a hall effect sensor on each rotor or motor to sense when the rotor is at a particular angle, and since there are multiple electrical revolutions per mechanical revolution for a brushless motor which is controlled by an ESC, the angle of the rotating rotor in any position can be accurately estimated based on the number of electrical revolutions since the hall effect sensor was detected and by the phase of the current electrical revolution. The ESC can provide the electrical revolutions and phase of each electrical revolution.

Mixer with Increased Dynamic Range

A flight controller for a multi-rotor aircraft processes information from sensors such as gyros, accelerometers, magnetometers, and barometers to estimate the attitude, the rate of change in attitude, the altitude, and the rate of change in altitude of the aircraft. The flight controller also receives command or control inputs that may specify the desired roll, pitch, and yaw attitudes and/or attitude rate of change for the aircraft as well as the desired altitude and/or rate of change in altitude. Sensor information and command or control inputs are processed by the flight controller to generate control information for setting and/or changing roll, pitch, yaw, and/or thrust generated by a rotor to achieve the commanded inputs. The generated control information is roll, pitch, yaw, and/or thrust control information. Further processing is necessary to convert the control information into rotor control inputs such that the control information will correctly affect the corresponding attitude or altitude. For example, roll control information should result in controlling the roll attitude of the aircraft without affecting pitch, yaw, or thrust. This is the case for any/all of pitch, yaw, and thrust. The processing unit used to convert the control inputs related to roll, pitch, yaw, and/or thrust control of the aircraft to rotor control inputs is generally call a mixer.

The input to the mixer includes the four types of flight control: thrust, roll, pitch, and yaw. The outputs of the mixer are the rotor control values for each rotor where a given rotor control value corresponds to controlling the rotational speed of the motor directly driving the rotor. The processing by the mixer of the thrust, roll, pitch, and yaw control inputs and generating of a rotor control output for a given rotor involves multiplying the control inputs by coefficients for that rotor based on the rotor's physical position relative to the axes of pitch, roll, and yaw and how the position affects the respective axes and summing of the resulting control terms.

For example, the control information for a rotor, that is, a rotor control input, may be computed from thrust, roll, pitch, and yaw control information as follows:

$$\text{Out1} = \text{Thrust} + \text{Coef1}*\text{Roll} + \text{Coef2}*\text{Pitch} + \text{Coef3}*\text{Yaw} \quad (6)$$

In equation (6), Out1 is the rotor control input for a particular rotor and Coef1, Coef2, and Coef3 are based on the rotor's position (including distance) relative to the roll, pitch, and yaw axes of the aircraft, respectively. The coefficients may be positive or negative depending on the direction of rotation about an axis corresponding to positive thrust by the rotor.

A mixer for the eight-rotor, hybrid gyrodyne aircraft 100 of FIG. 1 where paired rotors have a coaxial configuration with all rotors equidistant from the center of gravity of the aircraft 100 and on 45-degree radials from a vertical axis (not shown) is based on the following eight equations:

$$\text{Out1} = \text{limit}(\text{thrust}-\text{roll}+\text{pitch}+\text{yaw, min, max}) \quad (7)$$

$$\text{Out2} = \text{limit}(\text{thrust}+\text{roll}+\text{pitch}-\text{yaw, min, max}) \quad (8)$$

$$\text{Out3} = \text{limit}(\text{thrust}+\text{roll}-\text{pitch}+\text{yaw, min, max}) \quad (9)$$

$$\text{Out4} = \text{limit}(\text{thrust}-\text{roll}-\text{pitch}-\text{yaw, min, max}) \quad (10)$$

$$\text{Out5} = \text{limit}(\text{thrust}+\text{roll}+\text{pitch}+\text{yaw, min, max}) \quad (11)$$

$$\text{Out6} = \text{limit}(\text{thrust}-\text{roll}+\text{pitch}-\text{yaw, min, max}) \quad (12)$$

$$\text{Out7} = \text{limit}(\text{thrust}-\text{roll}-\text{pitch}+\text{yaw, min, max}) \quad (13)$$

$$\text{Out8} = \text{limit}(\text{thrust}+\text{roll}-\text{pitch}-\text{yaw, min, max}) \quad (14)$$

In equations (7) to (14), Out1 corresponds to rotor 101a in FIG. 1, Out2 corresponds to rotor 101b, Out3 corresponds to rotor 101c, and so on. Rotors 101a, c, g, e spin counter-clockwise (corresponding to Out1, Out3, Out5, Out7 respectively), and rotors 101b, d, f, h spin clockwise (corresponding to Out2, Out4, Out6, Out 8 respectively). The function limit (x, min, max) limits the value x to a range corresponding to a minimum (min) and a maximum (max) rotor control value. This process of limiting when one or more outputs exceed the minimum or maximum range is also known as saturation.

The mixer outputs must be connected to the correct rotor on the aircraft as described above for proper control. The aircraft will roll to the right if the rotational speeds of the rotors on the left side of the aircraft are higher than the rotational speeds of rotors on the right side. Similarly, the aircraft will increase in pitch (nose up) if the rotational speeds of rotors on the front of the aircraft are higher than the rotational speeds of rotors on the rear. Finally, the heading of the aircraft will move to the right if the rotational speeds of counterclockwise rotors are higher than the rotational speeds of clockwise rotors.

Some mixer embodiments use numerical values of thrust control input to the mixer in the range of 0.0 to 1.0 where 0.0 represents the minimum thrust control input and 1.0 the maximum thrust control input. The rotor control outputs are also limited to the range of 0.0 to 1.0 where 0.0 represents the minimum rotational speed of a rotor (and motor) and 1.0 the maximum rotational speed of the rotor (and rotor). Roll, pitch, and yaw control inputs are in the range of −0.5 to +0.5 where −0.5 represents the value for maximum rate of roll left, maximum rate of pitch down (nose down), and maximum rate of yaw (heading) change left, 0.0 is a neutral value, and +0.5 represents the value for maximum rate of roll right, maximum rate of pitch up, and maximum rate of yaw change right.

The mixer outputs, which are the rotor control values for the rotational speed of each rotor, can be entered into the following equations in order to calculate the effective (or actual) control output values of effective thrust (EffThr), effective roll (EffRoll), effective pitch (EffPitch) and effective yaw (EffYaw):

$$\text{EffThr} = (\text{Out1}+\text{Out2}+\text{Out3}+\text{Out4}+\text{Out5}+\text{Out6}+\text{Out7}+\text{Out8})/8 \quad (15)$$

$$\text{EffRoll} = (-\text{Out1}+\text{Out2}+\text{Out3}-\text{Out4}+\text{Out5}-\text{Out6}-\text{Out7}+\text{Out8})/8 \quad (16)$$

$$\text{EffPitch} = (\text{Out1}+\text{Out2}-\text{Out3}-\text{Out4}+\text{Out5}+\text{Out6}-\text{Out7}-\text{Out8})/8 \quad (17)$$

$$\text{EffYaw} = (\text{Out1}-\text{Out2}+\text{Out3}-\text{Out4}+\text{Out5}-\text{Out6}+\text{Out7}-\text{Out8})/8 \quad (18)$$

If the mixer outputs before limiting do not exceed the range from 0.0 to 1.0 (that is, saturation does not occur), then the effective values for thrust, roll, pitch, and yaw will match the original rotor control inputs using equations (15) to (18). The mixing process becomes non-linear when saturation occurs. Since the equations above include all possible combinations of adding and subtracting roll, pitch, and yaw, saturation will occur with one or more of the outputs when |roll|+|pitch|+|yaw|>minimum(thrust, 1-thrust). Note the pair of vertical lines "||" indicates the absolute value of the variable between the lines. When saturation occurs, the value of the mixer output that exceeds the limit by the maximum amount is equal to (|roll|+|pitch|+|yaw|)—thrust when thrust <0.5 and is equal to thrust−1.0+(|roll|+|pitch|+|yaw|) when thrust>0.5.

Once saturation occurs, the effective control output value for one or more of thrust, roll, pitch, and yaw will be different than the original input control values. As shown in equation (15) above, effective thrust is the average of all eight outputs. Thus due to saturation, the effective control output value of thrust increases relative to the input thrust control value when thrust <0.5 since the average value of the outputs increase after limiting is applied, and the effective control output value of thrust decreases relative to the input thrust control value when thrust>0.5 since the average value of the outputs increase after limiting is applied. This results in changing altitude or a change in rate of change in altitude different than the input thrust control intention. Similarly, the effective control output values of roll, pitch, and/or yaw will be reduced in magnitude after limiting is applied. In certain circumstances for some mixers, the effective control output values of roll, pitch, and/or yaw can inadvertently become very small and reduce the ability to control the motion of the aircraft around respective axes.

Saturation is of particular concern for an aircraft in forward flight operating near autorotation as the thrust control value to maintain altitude (to not climb or descend) is very close to the minimum limit since the average rotational speed for rotors in autorotation is very low relative to the average rotational speed required to hover. Thus, even relatively small control inputs of roll, pitch, and/or yaw when in forward flight can result in mixer saturation causing lower effective roll, pitch, and/or yaw control output. Further, mixer saturation at low thrust control input settings will result in higher effective thrust control output values resulting in an increase in altitude or rate of change in altitude that was not intended.

Different methods can be used to manage saturation. Most involve making trade-offs as to the resulting effective control of one or more control axes. Some of these approaches include a combination of reducing the roll, pitch, and/or yaw control inputs, adjusting the thrust control input toward 0.5, and accepting some amount of saturation. However, these methods do not account for operating at very low thrust settings as this condition is not encountered with conventional multi-rotor aircraft which operate at relatively high thrust settings.

In some embodiments for a multi-rotor flight controller, the mixer is implemented such that effective yaw is reduced to zero in some cases where roll and pitch control inputs are large giving priority to control of pitch and roll control over control of yaw control. Also in this embodiment, thrust can be increased or decreased to avoid mixer saturation, or minimize the amount of mixer saturation, giving priority to control of attitude control over control of altitude. The trade-offs in the solutions described in the prior two paragraphs are generally not desirable for the hybrid gyrodyne aircraft 100 of FIG. 1 since control of motion around all axes at very low thrust settings is desired.

The rotor redundancy that exists when there are more than four rotors can be used to keep the effective thrust control output to the same value as the thrust control input while at the same time providing an increase in the effective attitude control output range for roll, pitch, and/or yaw over some other mixing techniques when saturation occurs. This new approach includes pre-processing the roll, pitch, and/or yaw control input values to eliminate saturation. For example, the aircraft 100 in FIG. 1 has eight rotors 101a-h in coaxial-paired configuration, which is effectively two complete quadcopters. One quadcopter is formed by the top set of rotors 101e, f, g, h, and the second is formed by the bottom set of rotors 101a, b, c, d. By using this redundancy in rotors, the reduction in the effective control outputs of the mixer for roll, pitch, and/or yaw relative to the roll, pitch and yaw control inputs that occurs with some other mixing techniques when saturation occurs can be minimized, and in some cases, the reduction can be completely eliminated as will be shown in the described examples.

For each of the coaxial rotor pairs 101a,f, 101b,e, 101c,h, and 101d,g in FIG. 1, the top rotor always rotates in the opposite direction of the bottom rotor. Thus, if the rotational speed of the rotors on one diagonal (e.g. rotors 101a, c, f, h) is increased and the rotational speed of the rotors on the other diagonal (e.g. rotors 101b, d, e, g) is decreased, the net effect can be no change to the effective control output of thrust, roll, pitch, and/or yaw.

Figure 5:
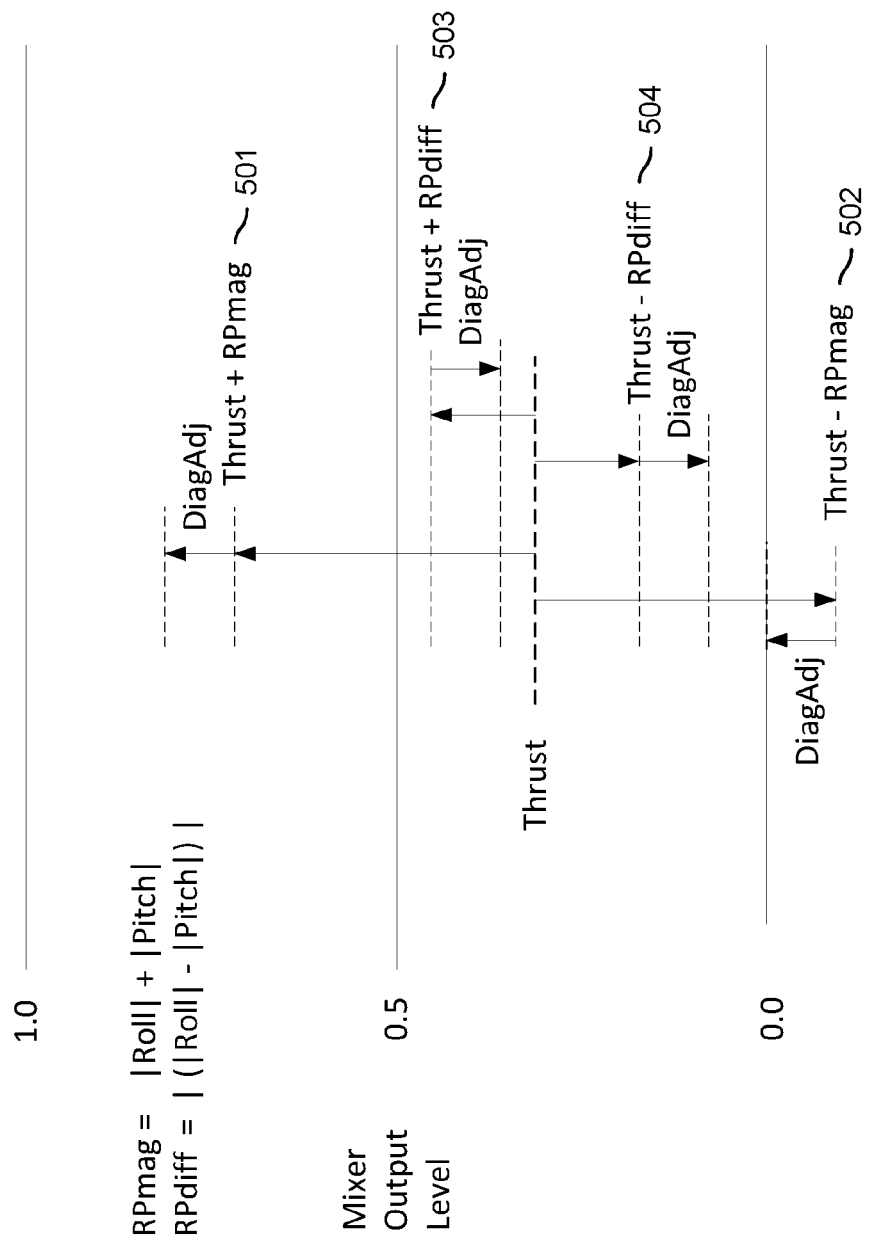
FIG. 5 shows a graph-based example of adjusting the output of a mixer for converting thrust, roll, and pitch control information to rotor control information to increase the dynamic range of effective control.

FIG. 5 demonstrates an example where diagonal rotor speed adjustment can be used to increase the dynamic range of pitch and roll control when one of the mixer outputs would otherwise exceed a control limit due to relatively large values of pitch and roll control input. In FIG. 5, Thrust, Roll, and Pitch are the control inputs to the mixer. The yaw control input in FIG. 5 is assumed to be zero, thus the rotor control outputs for coaxial rotor pairs will be identical. Yaw is addressed later in the description for FIG. 6. The variable RPmag is the sum of the magnitudes (absolute values) of roll and pitch, and the variable RPdiff is the absolute value of the difference between roll and pitch. RPmag is the larger magnitude that is added and subtracted from Thrust to generate rotor control outputs 501 and 502 when applying equations 7 through 14 (with Yaw=0). These two sets of rotor control outputs 501 and 502 correspond to rotors on one diagonal, one value for one end of the diagonal, and the other value for the opposite end of the diagonal. RPdiff is the smaller magnitude that is added to and subtracted from Thrust to generate rotor control outputs 503 and 504 when applying equations 7 through 14. The second set of two rotor control outputs 503 and 504 correspond to rotors on the other diagonal, one value for one end of the other diagonal, and the other value for the opposite end of the other diagonal.

In the example in FIG. 5, the minimum rotor control value limit is exceeded when RPmag is subtracted from Thrust (rotor control output 502) as shown where the rotor control output 502 sits below the 0.0 line in FIG. 5, but the minimum rotor control value limit is not exceeded when RPdiff is subtracted from Thrust (rotor control output 504). Since the rotor control outputs 501 and 502 are on opposite diagonals from the rotor control outputs 503 and 504, values of the rotor control outputs 501 and 502 can be increased by DiagAdj and values of the rotor control outputs 503 and 504 can be decreased by DiagAdj without affecting effective roll, pitch, or yaw, with DiagAdj indicating the amount to be added and subtracted from rotors disposed along different (e.g., offset or perpendicular) diagonals. In this example, the magnitude of DiagAdj is the amount the minimum limit is exceed by the rotor control output 502. The maximum value of DiagAdj must be limited such that subtracting DiagAdj from the rotor control output 504 does not exceed the minimum limit and adding DiagAdj to the rotor control output 501 does not exceed the maximum limit.

The adjustment based on DiagAdj for this aircraft configuration can be performed at any time that the following conditions are met:

$$\text{thrust\_}m = \text{minimum}(\text{thrust}, 1.0-\text{thrust}) \qquad (19)$$

$$|\text{roll}| <= \text{thrust\_}m \qquad (20)$$

$$|\text{pitch}| <= \text{thrust\_}m \qquad (21)$$

$$|\text{roll}| + |\text{pitch}| <= 0.50 \qquad (22)$$

Without the diagonal rotor speed adjustment method (i.e., use of DiagAdj), |roll|+|pitch| must be less than or equal to thrust_m.

For example, when thrust=0.25, without diagonal rotor speed adjustment, |pitch| would be limited to 0.0 when |roll|=0.25, and |pitch| would be limited to 0.125 when |roll|=0.125 since referring to the set of equations 7 through 14, at least one output will result in a value of thrust−(|roll|+|pitch|). In contrast, and with use of the diagonal rotor speed adjustment method, both |roll| and |pitch| can be set simultaneously to 0.25 without exceeding the mixer limit, doubling the effective roll and pitch control output when applying the processing described in FIG. 5: RPmag=|0.25|+|0.25|=0.5, RPdiff=|0.25|−|0.25|=0.0, minimum limit exceeded by 0.25 (Thrust− RPmag=−0.25), DiagAdj=0.25 results in Thrust− RPmag+DiagAdj=0.0, Thrust− RPmin− DiagAdj=0.0, and Thrust− RPmax+DiagAdj=1.0.

The amount of effective yaw control output can also be increased by using rotor redundancy and diagonal rotor speed adjustment. The rotational speed of each coaxial rotor pair in FIG. 1 can be adjusted to add yaw control without affecting the thrust, roll or pitch. For example, since the rotors in a coaxial pair rotate in opposite directions, the speed of a top counterclockwise rotor can be increased and the bottom clockwise rotor decreased (in reference to each other) to provide yaw to the right without change to effective thrust, roll, or pitch.

Figure 6:
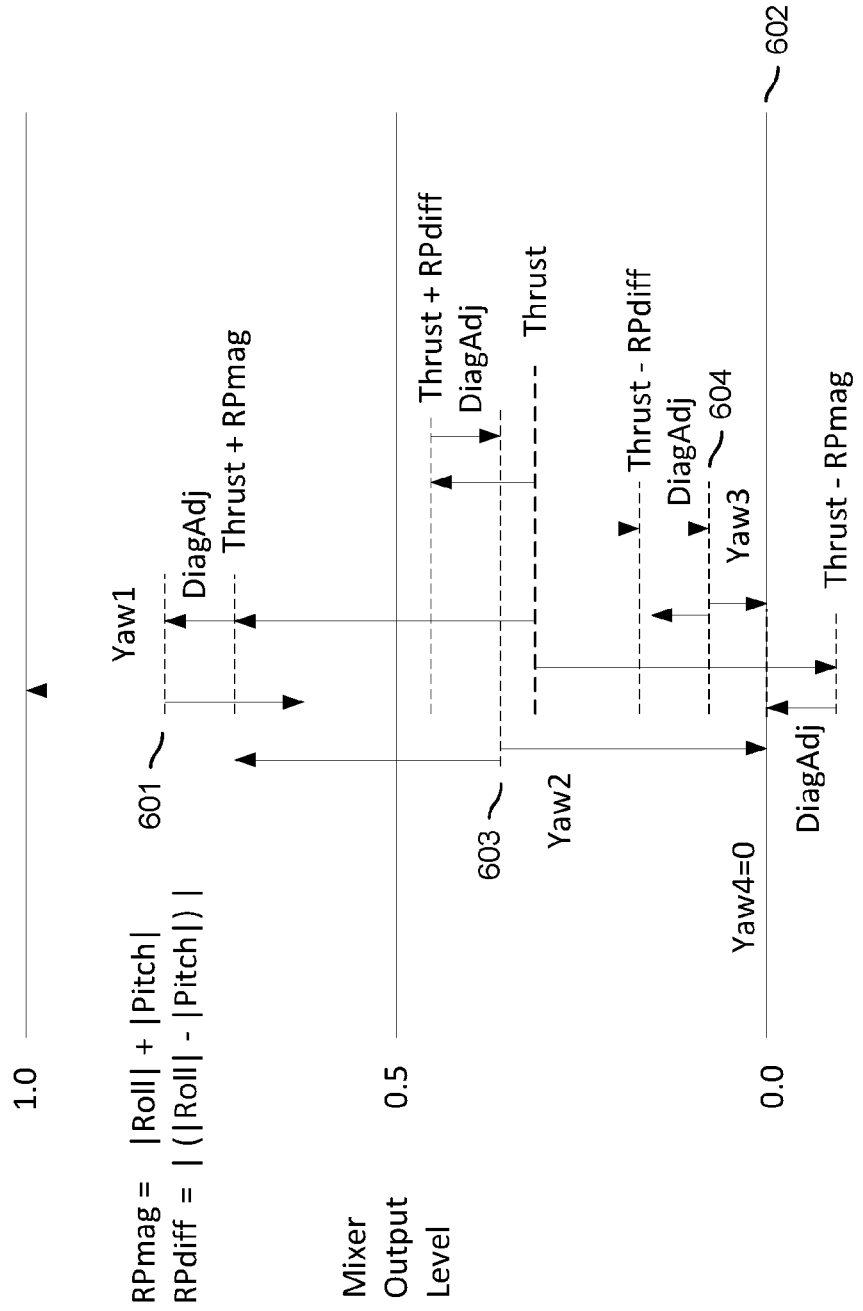
FIG. 6 shows a graph-based example adding yaw control information to the mixer graph of FIG. 5.

FIG. 6 is the same example as shown in FIG. 5 with the addition of yaw. Before yaw is added, rotor control outputs 601 and 602 are the rotor control outputs 501 and 502 in FIG. 5 after DiagAdj is added. Likewise, rotor control outputs 603 and 604 are the rotor control outputs 503 and 504 in FIG. 5 after DiagAdj is subtracted. Each of the four rotor control outputs 601 through 604 correspond to the rotor control output value for a coaxial pair of rotors. Since the rotor speeds of a coaxial rotor pair can be changed without changing thrust, roll, or pitch if the rotor speed for one rotor in the coaxial pair is increased the same amount the other is decreased, then by inspection of FIG. 6 it can be seen that the maximum amount of yaw that is available is equal to the amount each rotor control output 601, 602, 603, 604 is distanced from the nearest limit. Thus, the total yaw available is the average of Yaw1, Yaw2, Yaw3, and Yaw4. However, in conventional mixing (as in the eight mixing equations of (7) to (14) above), the amount of yaw available without saturation in the example in FIG. 6 would be 0.0 (the minimum of Yaw1, Yaw2, Yaw3, and Yaw4). Thus, the effective yaw control output can be significantly higher using rotor redundancy.

For the case of the rotor configuration shown in FIG. 1, the control inputs roll, pitch, and yaw for a given thrust control input must meet the following equations/conditions to assure that saturation will not occur after diagonal rotor speed adjustment is applied and after the maximum available yaw is applied as described above. Meeting the following equations/conditions will also assure effective thrust is the same as the thrust control input:

$$\text{thrust}\_m = \min(\text{thrust}, 1.0-\text{thrust}) \tag{23}$$

$$|\text{roll}|, |\text{pitch}|, \text{ and } |\text{yaw}| \leq \text{thrust}\_m \tag{24}$$

The sum of any two of |roll|, |pitch|, and |yaw|<=0.50  (25)

If (|yaw|<=0.25)  (26)

|roll|+|pitch|+|yaw|<=thrust_m+0.25

Else

|roll|+|pitch|+2*|yaw|<=thrust_m+0.50

The equation for calculating the Maximum Simultaneous Value is:

$$|\text{roll}|, |\text{pitch}|, \text{ and } |\text{yaw}| = \min(\text{thrust}\_m, (\text{thrust}\_m + 0.25)/3) \tag{27}$$

Maximum Simultaneous Value is the magnitude of value that roll, pitch, and yaw can assume simultaneously without saturation after diagonal rotor speed adjustment is applied and after applying the maximum available yaw. Below are the steps for adjusting the magnitudes of roll, pitch, and yaw (e.g., using equations 23 through 26 above) to guarantee saturation does not occur based on this approach that provides maximum effective control output:

Step 1. Do not change any of |roll|, |pitch|, and/or |yaw| that are already below the Maximum Simultaneous Value.

Step 2. Set any value of |roll|, |pitch|, and/or |yaw| to thrust_m if the respective value is above thrust_m (equation 2. above).

Step 3. If |roll|, |pitch|, and |yaw| are all greater than the Maximum Simultaneous Value, then set all values to the Maximum Simultaneous Value.

Else, if one of |roll|, |pitch|, and |yaw| is above the Maximum Simultaneous Value, then impose the limits in equations (25) and (26). above to the one that is above the Maximum Simultaneous Value.

Else if two of |roll|, |pitch|, and |yaw| are above the Maximum Simultaneous Value, then impose the limits in equations (25) and (26) above to the two that are above the Maximum Simultaneous Value, reducing only the larger of the two values if possible, otherwise setting both values to the same value that meets the limits.

Processes and conditions can be similarly determined to increase effective control output by using the rotor redundancy without changing effective thrust for other rotor configurations where the number of rotors is greater than four.

Integrated Motor and Rotor

Since rotors are generally rigid (or semi-rigid) and fixed pitch, rotors provide most or all of the lift only on one side when operating in forward flight and thus the bending forces on the rotor blade, motor shaft, and motor bearings are fairly high as previously explained in reference to FIG. 3. Integrating a brushless motor and rotor blades into a rotor hub offers a number of advantages, including reduced weight, higher strength, and reduced drag. The brushless motors that meet the requirement to directly drive a rotor tend to be large in diameter and relatively thin, often referred to as "pancake" motors. Due to the thin profile of these pancake motors, the bearings that support the shaft are usually closely spaced and are not well suited for supporting high bending forces experienced in forward flight.

Figure 11:
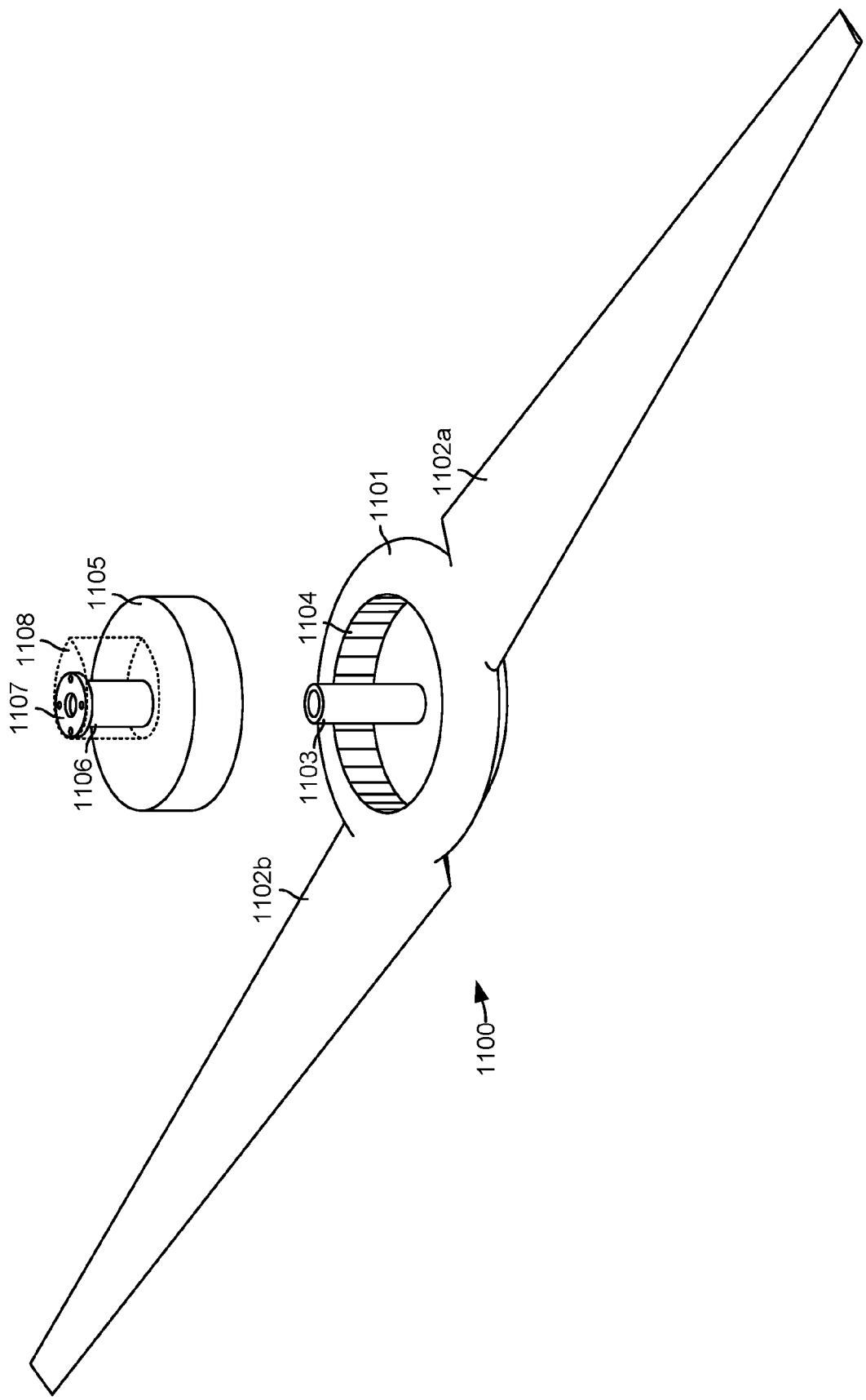
FIG. 11 shows a perspective view of a rotor with two blades and an integrated brushless motor.

To overcome these deficiencies, FIG. 11 shows an example of integrating a brushless motor into a 2-blade rotor 1100. The rotor 1100 includes a rotor hub 1101 defining a motor cavity, integrated rotor blades 1102*a,b* extending from the rotor hub 1101, a rotor bearing shaft 1103 extending from the rotor hub 1101 through the motor cavity, and magnets 1104, e.g., permanent magnets or electro-magnets, disposed in walls of the rotor hub 1101. The rotor 1100 also includes a separate but mating motor or stator assembly in the form of a housing 1105 that includes stator windings (not shown) disposed in the housing 1105, a motor bearing (not shown) that support the rotor bearing shaft 1103, and a shaft cover 1106 that extends from the housing 1105, around the rotor bearing shaft 1103, to a mounting flange 1107. The shaft cover 1106 can optionally include a fairing 1108 (shown in dotted line) or be otherwise aerodynamically shaped, such as having an airfoil shape. The number of integrated rotor blades is not limited to two blades as any number of blades may be used.

Figure 12:
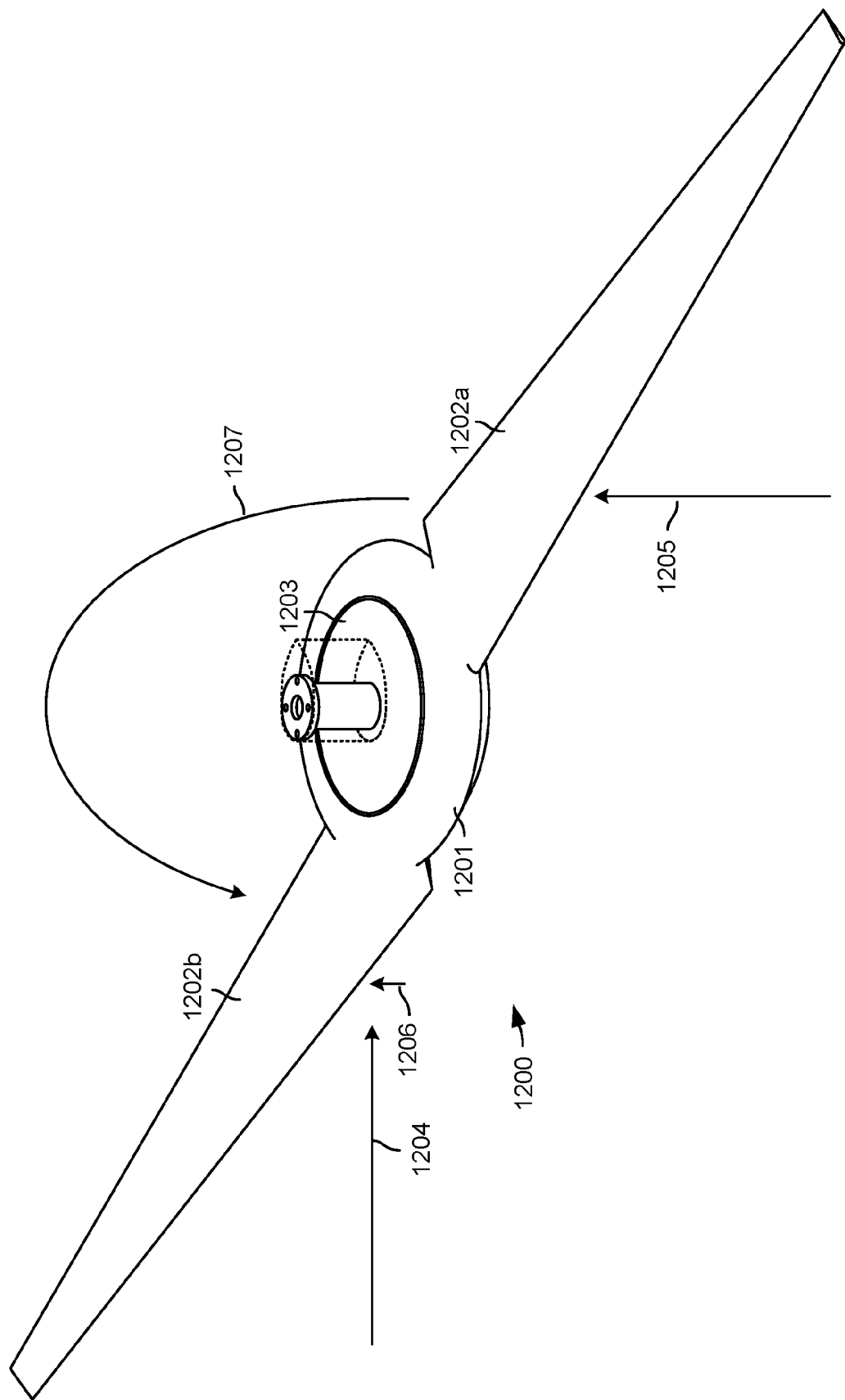
FIG. 12 shows the forces on the integrated blades and brushless motor of the rotor of FIG. 11 when an aircraft using the rotor is in forward autorotation flight.

FIG. 12 shows a rotor 1200 with an integrated rotor hub 1201 and rotor blades 1202*a,b* including a seated motor 1203, the motor 1203 being similar to the motor/stator assembly/housing 1105 of FIG. 11. Airflow direction 1204 is shown as flowing over the rotor hub 1201 and the blades 1202*a,b* in forward flight with the rotor 1200 operating near autorotation. This airflow direction 1204 results in a large lift force 1205 acting on the advancing blade 1202*a* and a small lift force 1206 acting on the retreating blade 1202*b*, resulting in a relatively large moment 1207 acting on the rotor hub 1201. Refer back to FIG. 3 to review how the load on a blade varies significantly with the angular position of the blade for each full rotation of 360 degrees.

As drawn in FIG. 12, the advancing blade 1202*a* is near the 60-degree position shown in FIG. 3, and the retreating blade 1202*b* is near the 270-degree position as shown in FIG. 3. Thus, the moment 1207 shown in FIG. 12 is near a maximum value when the advancing blade 1202*a* is at 90 degrees and the retreating blade 1202*b* is at 270 degrees, and the moment 207 will be at a minimum value (not shown) when the advancing blade 1202*a* is at 0 degrees and the retreating blade 1202*b* is at 180 degrees, respectively.

The extended tube (e.g., shaft cover 1106, FIG. 11) with mounting flange (e.g. mounting flange 1107, FIG. 11) is designed to provide the correct spacing between coaxial pairs of rotors when each of the rotors is mounted to the aircraft with the mounting flange. The extended tube (shaft cover 1106, FIG. 11) also contains at least one motor bearing and its length, together with the length of rotor bearing shaft (1103, FIG. 11) provides increased spacing between the motor bearings to support the large moment 1207, reducing the load on the bearings as compared to pancake-type motors. Fairing 1108 in FIG. 11 depicted with dashed lines reduces drag and covers the wires that connect the motor to the ESC located, for example, in the aircraft.

In FIG. 12, the rotor hub 1201 and the rotor blades 1202*a,b* can be designed as a single carbon fiber unit designed for minimum aerodynamic drag in forward flight and to carry the varying loads shown in FIGS. 3 and 12. The rotor hub 1201 can be disc-shaped or another low drag aerodynamic shape in respect to the airflow direction 1204 that smoothly blends into the blades 1202*a* and 1202*b*. In FIG. 11, the rotor bearing shaft 1103, together with a structure to support the magnets 1104 accurately relative to the rotor bearing shaft 110, can be constructed of metal, composite, or other high-strength material and molded into the rotor hub 1101, which can be formed, for example, of carbon fiber. The rotor hub 1101 can provide most of the strength and rigidity required to support the blades 1102*a* and 1102*b*, the rotor bearing shaft 1103, and the magnets 1104. For efficient operation of the integrated motor within the housing 1105 (also motor 1203 in FIG. 12), it is important to provide sufficient strength and rigidity so that the rotor hub 1101 together with the rotor bearing shaft 1103 maintains a position of the magnets 1104 as accurately centered about the rotor bearing shaft 1103 and the motor under the varying loads and moments shown in FIGS. 3 and 12.

Controlling Yaw in Forward Flight

Yaw is controlled in multi-rotor aircrafts by changing the rotational speed of the rotors since torque increases with increases in rotational speed. In some multi-rotor aircrafts, half of the rotors spin clockwise, and half of the rotors spin counterclockwise. Increasing the rotor rotational speeds of the counterclockwise rotors and decreasing the rotor rotational speeds of the clockwise rotors results in a yaw (or heading) change to the right. However, in forward flight when operating near autorotation, this relationship between torque and rotor rotational speed no longer remains, resulting in the inability to control yaw based on rotor rotational speed in some aspects of forward flight.

Figure 7:
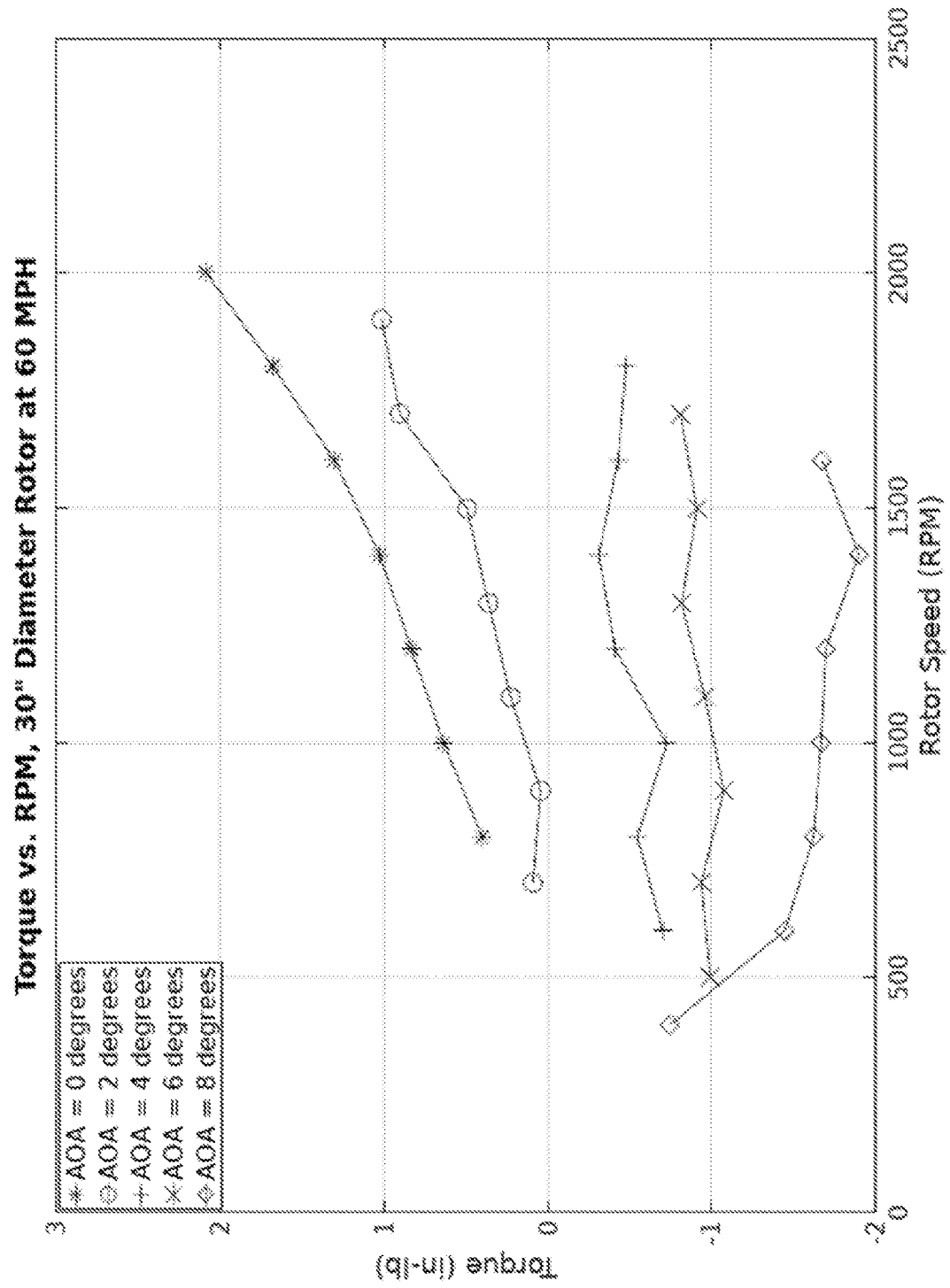
FIG. 7 shows a graph of the relationship between torque (in in-lbs) and rotor rotational speed for different angles measured for a 30-inch diameter rotor at 60 miles per hour.
Figure 8:
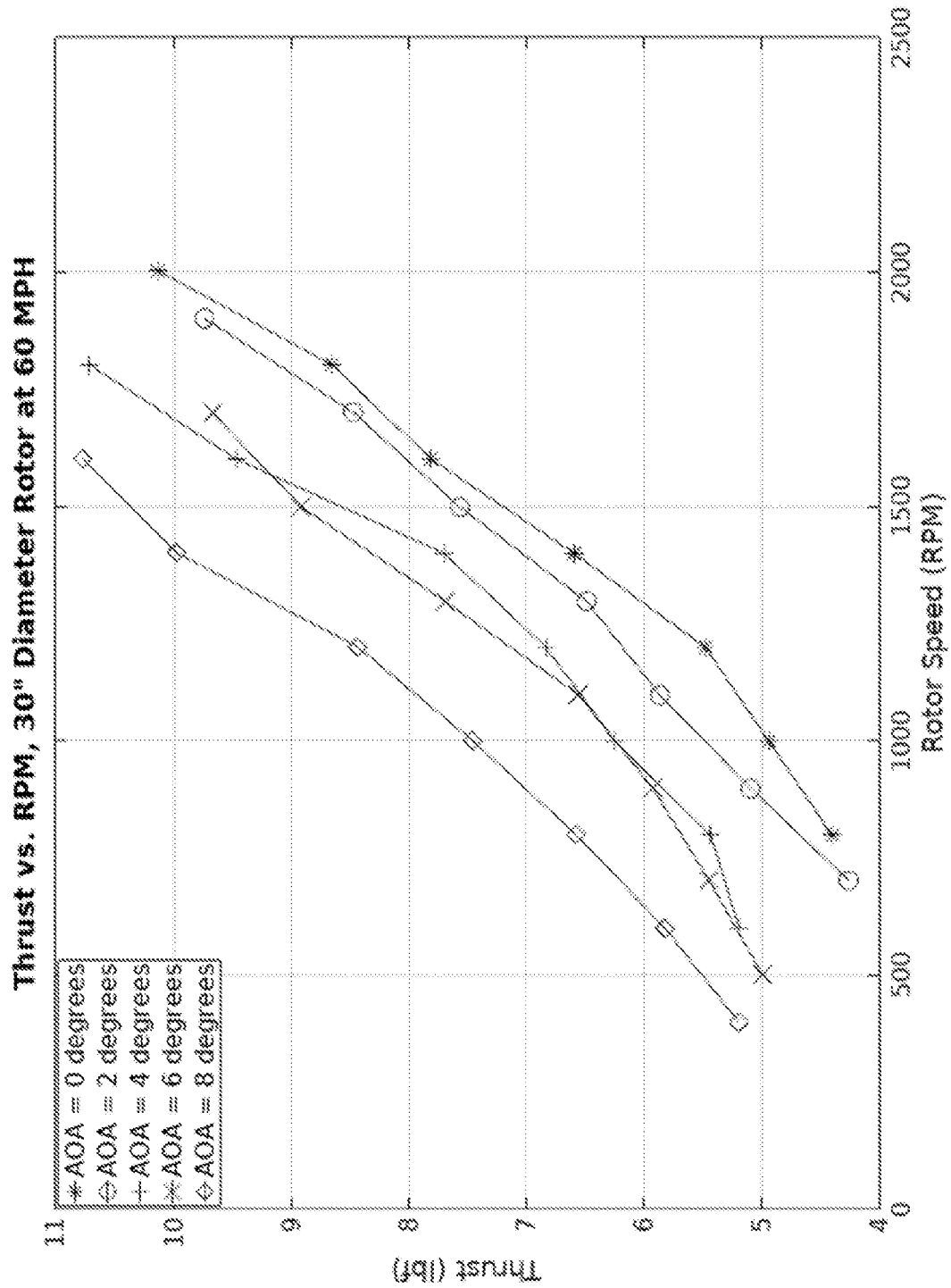
FIG. 8 shows a graph of the relationship between thrust (in lbf) and rotor rotational speed for different angles measured for a 30-inch diameter rotor at 60 miles per hour.

FIG. 10 shows an aircraft 1000 in forward flight with a relative airflow direction 1001, rotor planes 1002*a,b*, and rotor plane angles of attack 1003*a,b*, which are the angles between the relative airflow direction 1001 (here, along a horizontal plane) and the rotor planes 1002*a,b*. The rotor plane angle of attack 1003*b* shown in FIG. 10 is approximately 6 degrees from the horizontal plane, though a range of angles, such as between 4 and 6 degrees or 3 and 7 degrees, may be appropriate depending on overall aircraft configuration. FIGS. 7 and 8 show data measured from tests of a 30-inch diameter rotor at 60 miles per hour for different angles of attack 1003*a,b* of the rotor planes 1002*a,b*.

FIG. 7 is a graph with curves showing that torque increases with rotor rotational speed when the angle of attack is 0 degrees, but torque decreases with increases in rotor rotational speed when the angle of attack is 8 degrees. Further, torque remains approximately the same for all rotational speeds when the angle of attack is 4 degrees and 6 degrees. Note also that the rotor is generating power for all rotational speeds when the angle of attack is 4 degrees and higher. An aircraft may fly for a period of time at an angle of attack where the rotors are generating power in order to recharge batteries to replace the power used during a vertical takeoff.

FIG. 8 shows the thrust generated for the same set of rotational speeds and angles of attack as shown in FIG. 7. Thrust (or lift) is in the range of approximately 5 to 10 pounds of force. Thrust increases with an increase in rotational speed regardless of the angle of attack.

In order to continue to provide yaw control in forward flight when operating near autorotation without adding a rudder control surface to the aircraft, each rotor plane can be inclined a few degrees perpendicular to the forward flight direction, for example, a few degrees above or below a horizontal plane, where the horizontal component of thrust from the inclination provides a yaw moment about the aircraft center of gravity with a very small loss in vertical lift. This is described in reference to FIG. 9.

Figure 9:
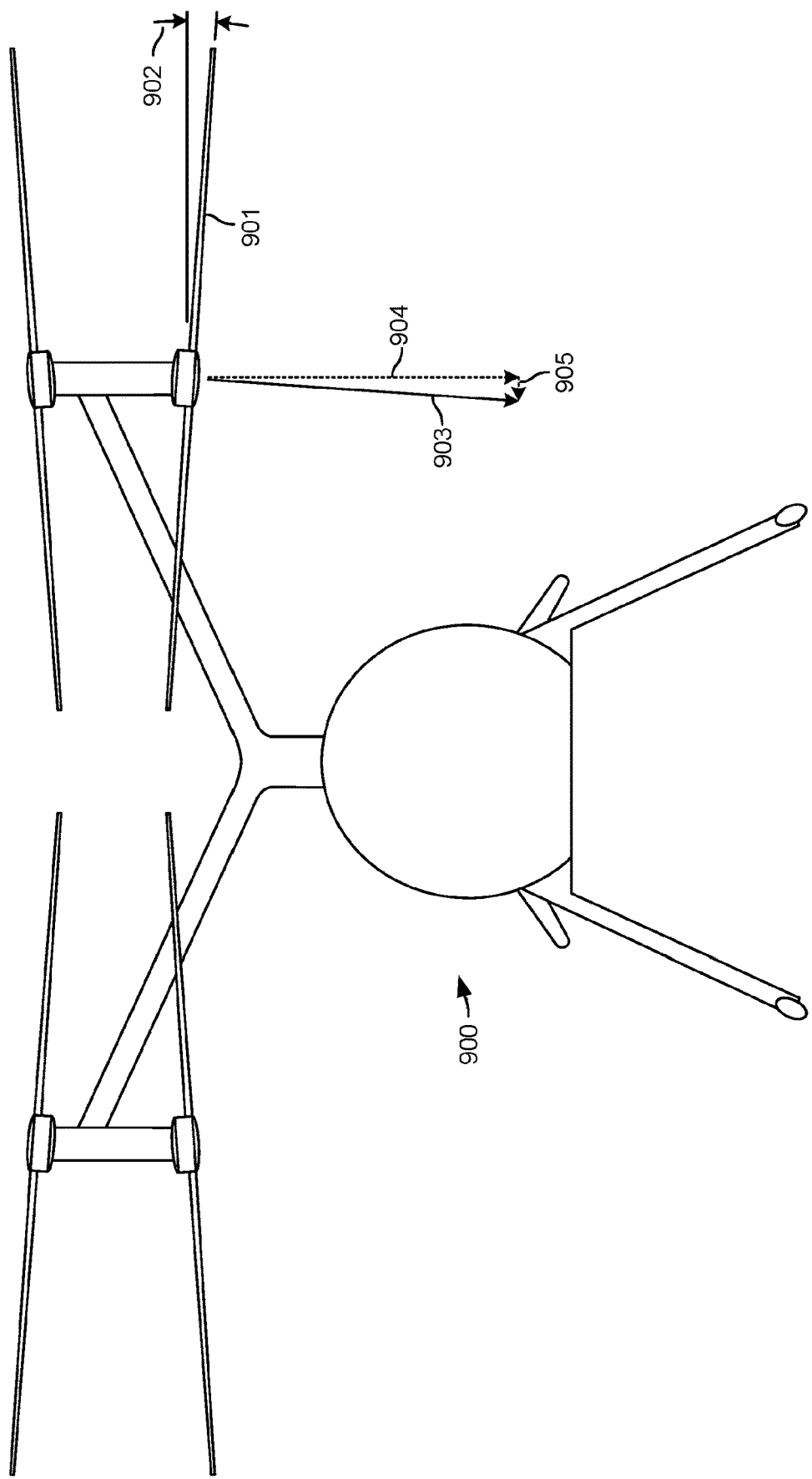
FIG. 9 shows a front view of the aircraft in FIG. 1 with rotor planes angled perpendicular to the direction of forward flight and the corresponding thrust forces on one of the rotors.

FIG. 9 is a front view of an aircraft 900, with a rotor 901 inclined to an angle 902 with the inclination being perpendicular to the direction of flight and measured in respect to a horizontal plane. A thrust vector 903 has a vertical component 904 given by the magnitude of the thrust vector 903 multiplied by the cosine of the angle 902 and a horizontal component 905 given by the magnitude of the thrust vector 903 multiplied by the sine of the angle 902. The rotor 901 is on the bottom of a coaxial pair of rotors, is located at the front left side of the aircraft, and rotates clockwise. The horizontal component 905 of thrust vector 903 results in a yaw moment to turn the aircraft 900 to the left since the rotor 901 is located well in front of the center of the aircraft 900. Thus in hover, an increase in rotational speed of the clockwise-turning rotor 901 will result in both an increase in torque and an increase in the moment due to the horizontal component 905 of the thrust vector 903.

The direction of the inclination angle of each rotor must be consistent with the rotor's rotational direction and physical position relative to the center of the aircraft so that the horizontal thrust generated by the angle results in a yaw moment acting in the same direction as the torque from the rotor in hover. The inclination angle also needs to be large enough to provide sufficient horizontal thrust and associated yaw moment to overcome the reverse yaw resulting from the reversal of torque vs. rotor speed at high angles of attack as shown in FIG. 7. An angle between 4 and 6 degrees will generally be sufficient. At 4 degrees, the loss in vertical thrust is only 0.25% (1-cos(4 degrees)) and the horizontal thrust is 7.0% (sin(4 degrees)) of the vertical thrust. At 6 degrees, the loss in vertical thrust is 0.55% (1-cos(6 degrees)) and the horizontal thrust is 10.5% (sin(6 degrees)) of the vertical thrust. Because the inclination angle is perpendicular to the direction of flight, there is no change to the rotor drag.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. An aircraft, comprising:
   a fuselage;
   a propulsion engine coupled to the fuselage and configured to generate thrust to propel the aircraft along a first vector during forward flight;
   coaxial pairs of rotors coupled to the fuselage and configured to provide lift to the aircraft along a second vector during forward flight, each rotor comprising two blades extending in opposite directions from a rotor hub, each rotor coupled to a motor, each motor configured to supply power to and draw power from the coupled rotor, and each rotor having one or more sensors configured to detect an angular position of the two blades; and
   a flight control system configured to control the motors based on input from the one or more sensors such that the two blades of first and second rotors in one or more of the coaxial pairs of rotors are offset about a shared axis of rotation by a phase difference of approximately ninety degrees,
   wherein the angular position of the two blades of the second rotor is synchronized relative to the angular position of the two blades of the first rotor using a phase-locked control loop when operating the first and second rotors substantially in autorotation at cruising speed during forward flight.

2. The aircraft of claim 1, wherein a pitch angle of a rotor plane for each of the rotors behind a center of gravity of the aircraft is fixed in position and increased relative to a pitch angle of a rotor plane for each of the rotors forward of the center of gravity of the aircraft.

3. The aircraft of claim 1, wherein the flight control system is further configured to control the motors such that the two blades of the first and second rotors in one or more of the coaxial pairs of rotors are offset from each other about the shared axis of rotation by an angle other than ninety degrees in hover or at flight speeds below cruising speeds to increase thrust efficiency.

4. The aircraft of claim 1, wherein the flight control system is configured to control the motors such that the two blades of first and second rotors in at least one of the coaxial pairs of rotors rotate in the same direction about the shared axis of rotation.

5. The aircraft of claim 1, wherein at least one of the coaxial pairs of rotors is configured to be driven by its corresponding motors during forward flight to provide lift to the aircraft along the second vector during forward flight.

6. The aircraft of claim 5, wherein the flight control system is configured to control the corresponding motors of the at least one of the coaxial pairs of rotors configured to be driven during forward flight in a power managed regime in which a net electrical power, consisting of a sum of the power being supplied to or drawn from each rotor by its motor, is maintained within a range determined by a feedback control system of the flight control system.

7. The aircraft of claim 5, further comprising:
   wings that provide lift along the second vector during forward flight, wherein lift generated by the rotors behind a center of gravity of the aircraft is approximately the same as lift generated by the rotors forward of the center of gravity of the aircraft in forward flight.

8. The aircraft of claim 5, further comprising:
   wings that provide lift along the second vector during forward flight, wherein lift generated by the wings is approximately the same as lift provided by the coaxial pairs of rotors to the aircraft above a predetermined airspeed during forward flight.

9. An aircraft, comprising:
   a fuselage;
   a propulsion engine coupled to the fuselage and configured to generate thrust to propel the aircraft along a first vector during forward flight;
   coaxial pairs of rotors coupled to the fuselage and configured to provide lift to the aircraft along a second vector during forward flight, each rotor comprising a single pair of blades, each rotor coupled to a motor, each rotor having one or more sensors configured to detect an angular position of the single pair of blades, and each motor configured to supply power to and draw power from the coupled rotor;
   a flight control system configured to control the motors in a phase-locked control loop based on input from the one or more sensors such that the single pairs of blades of first and second rotors in at least one of the coaxial pairs of rotors are offset from each other about a shared axis of rotation, synchronized at a particular phase difference when each motor is operating substantially in autorotation at cruising speed; and
   wings extending from opposite sides of the fuselage and configured to provide lift to the aircraft along the second vector during forward flight, wherein the lift provided by the wings is configured to balance a pitching moment caused by the thrust of the propulsion engine being offset from a center of drag of the aircraft.

10. The aircraft of claim 9, wherein lift provided by the wings to the aircraft along the second vector during forward flight is approximately the same as lift provided by the coaxial pairs of rotors to the aircraft above a predetermined airspeed during forward flight.

11. The aircraft of claim 9, wherein a center of lift of the wings is at or behind a center of gravity of the aircraft.

12. The aircraft of claim 9, wherein the first vector is substantially perpendicular to a force of gravity acting on the aircraft and the second vector is substantially parallel to the force of gravity acting on the aircraft.

13. The aircraft of claim 9, further comprising:
a horizontal stabilizer configured to provide lift to the aircraft along the second vector during forward flight, wherein the lift provided by the horizontal stabilizer is configured to balance the lift generated by the coaxial pairs of rotors in forward flight, and wherein a center of lift of the horizontal stabilizer is offset from a center of gravity of the aircraft.

14. The aircraft of claim 9, wherein the blades in the single pair of blades of each rotor extend from a rotor hub in opposite directions, and wherein the particular phase difference is approximately 90 degrees during forward flight.

15. The aircraft of claim 9, wherein power being supplied to or drawn from each rotor by its corresponding motor adjusts a rotational frequency of the rotor to provide attitude control for the aircraft.

16. An aircraft, comprising:
a fuselage;
a propulsion engine coupled to the fuselage and configured to generate thrust to propel the aircraft along a first vector during forward flight;
coaxial pairs of rotors coupled to the fuselage and configured to provide lift to the aircraft along a second vector during forward flight, each rotor comprising two blades, each rotor coupled to a motor, each rotor including one or more sensors configured to detect an angular position of the two blades, and each motor configured to supply power to and draw power from the coupled rotor, wherein the rotors in each coaxial pair are controlled by corresponding motors to rotate in the same direction about an axis of rotation of the coaxial pair; and
a flight control system configured to control the motors based on input from the one or more sensors such that the two blades of first and second rotors in at least one of the coaxial pairs of rotors are offset about the axis of rotation to achieve a phase difference of approximately ninety degrees,
wherein the angular position of the two blades of the second rotor is synchronized relative to the angular position of the two blades of the first rotor using a phase-locked control loop when operating the first and second rotors substantially in autorotation at cruising speed during forward flight.

17. The aircraft of claim 16, further comprising:
a horizontal stabilizer configured to provide lift to the aircraft along the second vector during forward flight, wherein the lift provided by the horizontal stabilizer is configured to balance lift generated by the coaxial pairs of rotors in forward flight.

18. The aircraft of claim 17, wherein the first vector is substantially perpendicular to a force of gravity acting on the aircraft and the second vector is substantially parallel to the force of gravity acting on the aircraft.

19. The aircraft of claim 17, wherein a center of lift of the horizontal stabilizer is offset from a center of gravity of the aircraft.

20. The aircraft of claim 19, wherein a moment from the center of lift of the horizontal stabilizer offset from the center of gravity of the aircraft is opposite in direction to a moment from a center of propulsion thrust offset from a center of drag.

\* \* \* \* \*